(12) United States Patent
Buckley et al.

(10) Patent No.: US 9,197,676 B2
(45) Date of Patent: Nov. 24, 2015

(54) SYSTEM AND METHOD FOR REDUCING MESSAGE SIGNALING

(75) Inventors: Adrian Buckley, Tracy, CA (US); John Hendrik Lucas Bakker, Irving, TX (US); Alexander Shatsky, Ontario (CA)

(73) Assignee: BlackBerry Limited, Waterloo, Ontario (CA)

( * ) Notice: Subject to any disclaimer, the term of this patent is extended or adjusted under 35 U.S.C. 154(b) by 1191 days.

(21) Appl. No.: 12/687,668

(22) Filed: Jan. 14, 2010

(65) Prior Publication Data
US 2011/0173434 A1   Jul. 14, 2011

(51) Int. Cl.
*G06F 15/16* (2006.01)
*H04L 29/06* (2006.01)

(52) U.S. Cl.
CPC ........ *H04L 65/1016* (2013.01); *H04L 65/1006* (2013.01); *H04L 65/80* (2013.01)

(58) Field of Classification Search
CPC .. H04L 65/1016; H04L 65/1006; H04L 65/80
USPC ................................................. 709/227, 246
See application file for complete search history.

(56) References Cited

U.S. PATENT DOCUMENTS

| | | | | |
|---|---|---|---|---|
| 7,529,675 B2* | 5/2009 | Maes | ............................ | 709/227 |
| 7,542,556 B2* | 6/2009 | Bright et al. | .................. | 370/352 |
| 7,804,820 B2* | 9/2010 | Shi et al. | ........................ | 370/353 |
| 2006/0072721 A1* | 4/2006 | Wisniewski | ................ | 379/88.22 |
| 2008/0301747 A1* | 12/2008 | Yan et al. | ........................ | 725/118 |
| 2008/0310331 A1* | 12/2008 | Bakker et al. | .................. | 370/310 |
| 2009/0193512 A1* | 7/2009 | Buckley et al. | ..................... | 726/9 |
| 2009/0215483 A1* | 8/2009 | Albertsson et al. | ............ | 455/519 |
| 2010/0037045 A1* | 2/2010 | Schneyer et al. | ............. | 709/222 |
| 2010/0064172 A1* | 3/2010 | George et al. | .................... | 714/15 |
| 2011/0238845 A1* | 9/2011 | Keller et al. | ................... | 709/227 |
| 2012/0124222 A1* | 5/2012 | Noldus et al. | ................. | 709/227 |

\* cited by examiner

*Primary Examiner* — Minh-Chau Nguyen
(74) *Attorney, Agent, or Firm* — Trop Pruner & Hu, P.C.

(57) ABSTRACT

A system for communicating a message using a second signaling protocol is disclosed. The second signaling protocol provides a session control channel between a user agent (UA) and a network node and may include, for example the I1 protocol. The system identifies a first string to be transmitted within a first message. The first message is encoded in accordance with a first signaling protocol. The system associates the first string with a first key, and stores the first string and the first key in a database. The database associates the first string and the first key. The system encodes the first key within a second message, and transmits the second message using the second signaling protocol. The first string may include a plurality of data values. The system sorts the plurality of data values into an ordering, and associates each of the plurality of data values with a key.

16 Claims, 10 Drawing Sheets

SYSTEM AND METHOD FOR REDUCING MESSAGE SIGNALING

BACKGROUND

The present disclosure relates generally to more efficient signaling and more specifically to a system and apparatus for reducing an amount of information communicated using a first signaling protocol (e.g., session initiation protocol (SIP) signaling) or a second signaling protocol (e.g., I1 interface signaling).

As used herein, the terms "User Agent" and "UA" can refer to wireless devices such as mobile telephones, personal digital assistants (PDAs), handheld or laptop computers, and similar devices or other user equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes. Throughout this disclosure, UA may refer to a SIP UA such as a wireless device, set-top box, or other communication devices and is interchangeable with the term UA.

In Third Generation Partnership Project (3GPP) systems, an internet protocol (IP) multimedia subsystem (IMS) allows for the delivery of IP multimedia services. Using IMS, a UA may transmit and receive multimedia and/or voice packet switched (PS) communications via a base station implementing one or more IMS Functional Components. To implement IMS, networks rely upon session initiation protocol (SIP) to provide a text-based signaling protocol that may be used to communicate between a UA and the IMS Core Network (CN), between the IMS CN and Application Servers, and between various other components of the IMS Network.

In existing networks, IMS centralized services (ICS) allow various IMS services to be provided to a UA using a wireless network where voice communications are provided over a circuit-switched (CS) bearer and other media components are provided over packet-switched (PS) bearers and the control of the signaling may be performed using IMS or another protocol called I1 that is being defined in 3GPP TS 24.294. Example networks may include long term evolution (LTE) networks, Global System for Mobile communication (GSM) Enhanced Data rates for GSM Evolution (EDGE) Radio Access Network (GERAN) networks, or Universal Mobile Telecommunications System (UMTS) Terrestrial Radio Access Network (UTRAN) networks. ICS may also be configured to provide service control for features in the IMS network in circumstances when the wireless device is connected to a non-IMS network, such as when the UA is connected to a mobile switching center (MSC). The features controlled by ICS may include call hold, call transfer, calling line identity, etc.

Generally, ICS requires the simultaneous support of a bearer for voice and a bearer to support the control signaling that uses SIP signaling. In some circumstances, however, the bearer for supporting SIP signaling may be unavailable, for example, because Gm connectivity does not exist (e.g., no PS roaming agreement or IMS roaming agreement exists), the UA is unable to register with the IMS infrastructure because of operational issues, or dual transfer mode (DTM) is unavailable in the cell or the wireless device. In that case, the I1 protocol as being defined in 3GPP TS 24.294 allows a wireless device to implement a signaling protocol using a CS bearer in the place of the Gm interface. The signaling protocol can be a SIP-like protocol. In that case, the I1 protocol uses or binds to or is wrapped in transport protocols such as, but not limited to, short message service (SMS) or unstructured supplementary service data (USSD), etc. The use of these transport protocols limits the information payload per message or signaling, generally, to a maximum of 160 octets. Unfortunately, SIP is a verbose character-based protocol and, as a result, SIP-encoded signaling messages often do not fit in a limited payload such as that provided by SMS or USSD. Table 1 illustrates an example SIP-encoded message.

TABLE 1

INVITE tel:+1-212-555-6666 SIP/2.0
Via: SIP/2.0/UDP msc2.home1.net;branch=z9hG4bKnashds7
Max-Forwards: 70
Route: <sip:icscf1.home1.net;lr>
P-Preferred-Identity:
<sip:user2_public1@home1.net>,<tel:+1-212-555-2222>
P-Charging-Vector:
icid-value="AyretyU0dm+6O2IrT5tAFrbHLso=023551024"; orig-ioi=home2.net
Accept-Contact:
*;+g.3gpp.icsi-ref="urn%3Aurn-7%3gpp-service.ims.icsi.mmtel"
P-Access-Network-Info:
3GPP-UTRAN-TDD; utran-cell-id-3gpp=234151D0FCE11
Privacy: none
From: <sip:user2_public1@home1.net>;tag=171828
To: <tel:+1-212-555-6666>
Call-ID: f81d4fae-7dec-11d0-a765-00a0c91e6bf6
Cseq: 127 INVITE
Supported: 100rel, precondition, gruu, 199
Contact: <sip:user2_public1@home1.net;gr=urn:uuid:f81d4fae-7dec-11d0-a765-00a0c91e6bf6>; +g.3gpp.icsi-ref="urn%3Aurn-7%3gpp-service.ims.icsi.mmtel";+g.3gpp.ics="server"
Allow: INVITE, ACK, CANCEL, BYE, PRACK, UPDATE, REFER
Content-Type: application/sdp
Content-Length: (...)
v=0
o=− 2987933615 2987933615 IN IP6 5555::aaa:bbb:ccc:eee
s=
c=IN IP6 5555::aaa:bbb:ccc:eee
t=0 0
m=audio 3456 RTP/AVP 97 96
b=AS:25.4
a=curr:qos local sendrecv
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20

With reference to Table 1, there are several data elements that are included within the SIP message that add to the message's verbosity. For example, the original party identity ("P-Preferred-Identity: <sip:user2_public1@home1.net>, <tel:+1-212-555-2222>") may include a SIP uniform resource identifier (URI) and a tel URI. The Public User Identity SIP and tel URI strings (which can also be transported in SIP messages in other SIP header fields than the P-Preferred-Identity header field), however, can be relatively verbose as they take the form of "user@domain." Even though they are verbose, it is important to designate a Public User Identity of the user within a SIP message as a user may have many identities (e.g., Work, Home, or private identities) that are all registered with a particular wireless device. Accordingly, when transmitting a SIP message, the wireless device must determine which Public User Identity to use for identification and include that information in the SIP message. Similarly, when a UA receives a call (e.g., a wireless device terminated session) the user is made aware of which identity they were called on, so they know how to answer the call. Accordingly, the user identity information is included in SIP messages sent to and received from a UA.

Various SIP UA capabilities may also be included in the SIP message (e.g., "Accept-Contact: *;+g.3gpp.icsi-ref="urn%3Aurn-7%3gpp-service.ims.icsi.mmtel"). The SIP UA capabilities provide the network with an indication of the wireless device's capabilities. Because a wireless device may support many services, the SIP UA capabilities portion of the SIP message may include a significant amount of data necessary for a network to effectively communicate with a UA. The SIP message may also include a Call-ID header field (e.g., "Call-ID: f81d4fae-7dec-11d0-a765-00a0c91e6bf6") that may be used to refer to an existing SIP session using a Target-Dialog, such as in the case of an I1 message adding a voice component over a CS bearer.

Accordingly, SIP messages may include several data elements that include verbose data values such as definitions of public identities, device capabilities, and existing SIP session identifiers. In systems implementing SIP-like protocols over I1 interfaces, although these data points may be removed, it is generally preferable that they be included to provide an easier interworking and mapping between I1 and, for example, SIP. Unfortunately, these verbose data points may generate I1 messages that are larger than the maximum payload of the I1 interface resulting in inefficient transmission. Accordingly, there exists a need for compressing or otherwise minimizing the size of SIP-like messages over I1-like interfaces.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
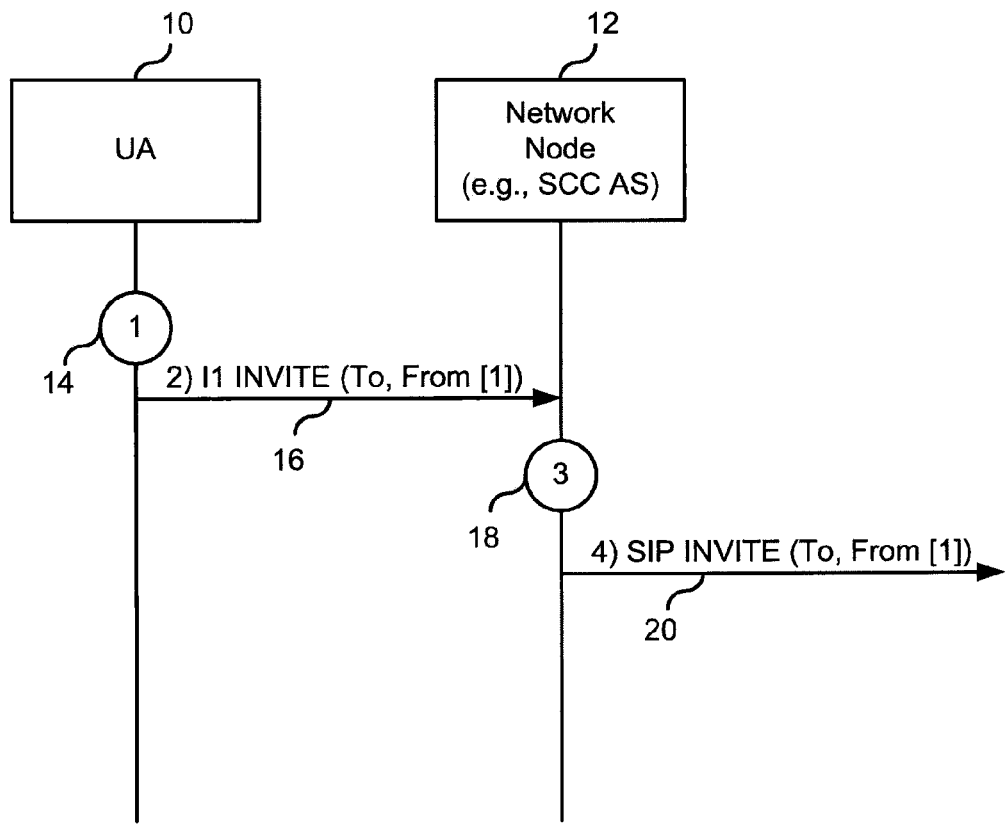
FIG. 1 is an illustration of a message flow for session initiation using an I1 interface wherein a user agent (UA) provides an indicium to the network identifying a Public User Identity.

The present disclosure relates generally to more efficient signaling and more specifically to a system and apparatus for reducing an amount of information communicated using a first signaling protocol (e.g., session initiation protocol (SIP) signaling) or a second signaling protocol (e.g., I1 interface signaling).

To this end, some embodiments include a method for communicating a message using an I1 interface. The I1 interface provides a session control channel between a user agent (UA) and a network node. The method includes identifying a first string, retrieving a first key associated with the first string, and encoding the first key within a message. The method includes transmitting the message to at least one of a UA and a network node using a session control channel.

Other embodiments include a method for communicating a message using an I1 interface. The I1 interface provides a session control channel between a user agent (UA) and a network node. The method includes receiving the message using the I1 interface, retrieving a first key from the message, and retrieving a first string associated with the first key. The first string can include a length-value (LV) encoded value.

Other embodiments include a method for communicating a message using a second signaling protocol. The second signaling protocol provides a session control channel between a user agent (UA) and a network node. The method includes identifying a first string to be transmitted within a first message. The first message is encoded in accordance with a first signaling protocol. The method includes associating the first string with a first key, and storing the first string and the first key in a database. The database associates the first string and the first key. The method includes encoding the first key within a second message, and transmitting the second message using the second signaling protocol.

Other embodiments include a method for communicating a message using a second signaling protocol. The second signaling protocol provides a session control channel between a user agent (UA) and a network node. The method includes receiving a first message encoded in accordance with a first signaling protocol. The first message includes a first string. The method includes associating the first string with a first key and storing the first string and the first key in a database. The database associates the first string and the first key. The method includes encoding the first key within a second message, and transmitting the second message using the second signaling protocol.

Other embodiments include an apparatus for communicating a message using an I1 interface. The I1 interface provides a session control channel. The apparatus may be at least one of a user agent (UA) and a network node. The apparatus comprises a processor configured to identify a first string to be transmitted within a message. The first string includes a length-value (LV) encoded value. The processor is configured to retrieve a first key associated with the first string, encode the first key within the message, and transmit the message to at least one of a UA and a network node using the I1 interface.

Other embodiments include an apparatus for communicating a message using a second signaling protocol. The second signaling protocol provides a session control channel. The apparatus may include at least one of a user agent (UA) and a network node. The apparatus may comprise a processor configured to receive a first message encoded in accordance with a first signaling protocol. The first message includes a first string. The processor is configured to associate the first string with a first key, and store the first string and the first key in a database. The database associates the first string and the first key. The processor is configured to encode the first key within a second message, and transmit the second message using the second signaling protocol.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Session initiation protocol (SIP) messages may include several verbose data elements including definitions of Public User Identities, device capabilities, and existing SIP session identifiers, etc. In systems implementing SIP-like protocols over I1 interfaces, for example, although these data points may be removed, it is generally preferable that they be included to provide an easier interworking and mapping between I1 and SIP. Unfortunately, these verbose data points may generate SIP messages that are larger than the maximum payload of, for example, the I1 interface resulting in inefficient transmission.

The present system compacts verbose information, including, for example, data elements such as the public identities, device capabilities, and existing SIP session identifiers found within SIP messages or other, for example, SIP-encoded messages, such as messages configured to be transmitted using the I1 interface. The embodiments described could also be applicable to other SIP information elements. The compacted information can be communicated between two entities and read by either party to retrieve, reproduce, or determine the original information. For example, the entities may include a String Sender and String Receiver, which may each include a UA, a network node, or other network entities. The present system may be configured to provide static or dynamic compression. In the case of static compression, the compression mapping is pre-defined and the same on both the UA and the network. In dynamic compression, the compression mapping may vary such that the same original data may result in different compressed data at different times. Although the present disclosure provides examples showing compression of particular portions of the messages, such as particular headers or data elements, any of the content of the message may be eligible for compression in accordance with the present disclosure.

Although the present disclosure presents examples of the present system as the system relates to minimizing the amount of data included within SIP or SIP-like encoded messages for transmission using the I1 interface or other interfaces, the present system may be used in any implementation having first and second signaling protocols where a message may be encoded in accordance with a first signaling protocol and transmitted using a second signaling protocol. Alternatively, the system may be used to minimize the amount of data included within a message encoded in accordance with a first signaling protocol, where the message is also transmitted using the first signaling protocol.

In the present system, the UA and the network are configured to assign identifier strings, keys, or indicia to each of several values that may be included within a message. In various implementations the identifier strings, keys, or indicia may include symbols, identifiers, references, IDs, hashes, numbers, alphanumeric strings, hex values, or any other data that may be used as a reference value or identifier. In one embodiment, the identifier strings, keys, or indicia, are correlated with other bytes/words or strings of characters using dictionaries. The terms 'strings', 'keys' or 'indicia'/'indicium' are used in the present disclosure interchangeably and may be considered to have the same meaning. When communicating, the UA and the network use those indicia in place of the original values, which may be relatively large. Because the indicia include less data than the original values themselves, the amount of data transmitted between the UA and the network may be minimized. Depending upon the system implementation, the assignment of the indicia may be explicit (e.g., by providing a pre-determined dictionary of indicia) or implicit (e.g., such as when an ordering of the Public User Identities determines the indicium to be used). The indicia may include text strings, American Standard Code for Information Interchange (ASCII) strings, hex data, or any other information or data that may be associated with a particular string or data value. The indicia may include numeric indexes or counters, or portions of the strings to which the indicia refer. Generally, several indicia that all relate to possible values for a single data element within a message are unique and distinct. Across data elements, however, there may be several indicia that each share the same value. For example, the indicia '1', '2', and '3' may be defined for a first data element within a message, and the indicia '1', '2', '3', and '4' may be defined for a second data element within a message. Alternatively, the absence of any indicia within a SIP or I1 message may constitute implicit indicia that indicates a default value should be used. Additionally, in some contexts the need for reserved values is apparent. For example, in the event of "session control fallback" as discussed in 3GPP TS 24.294 and/or 3GPP TS 24.292, a header may be present in an I1 message but the header value is preferably not used, because, if present, information received over Gm or using SIP or otherwise is used in the header value's place. In such an event, it would be advantageous if a reserved value or indicia is used. The reserved value may indicate a default string such as a Public User Identifier in the absence of values received over Gm or using SIP, or the reserved value may indicate that the values received over Gm or using SIP are to be used.

In one specific implementation, the UA and the network node may assign identifier strings, keys, or indicia to each of the Public User Identities associated with a particular UA or a user. When communicating, the UA and the network use those indicia to refer to the Public User Identities. The indicia, which are shorter than the associated Public User Identity, may then be passed back and forth between the UA and the network for referring to a particular Public User Identity and minimizing data traffic communications. In this implementation, the UA includes a memory for storing the public identities and the associated indicia. The memory may be internal, external, or removable to the UA and may include, for example, (U)SIM, compact flash, secure digital, miniSD or other memory cards or storage devices. Alternatively, the memory may reside within the UA such as in a non-volatile memory medium. For the purposes of the rest of this application when the term memory appears it shall be understood that the memory may be internal or removable, or a combination thereof, where the removable memory could be at least any of those identified previously or other forms.

The Public User Identities may be provided to the UA and stored in a database in memory in a priority order. The Public User Identities may then be associated with an indicium, where the indicium includes a unique identifier for each identity. The indicia to be associated with each Public User Identity may be determined by the priority order. For example, a positional priority may be implemented wherein a Public User Identity listed first within memory has a higher priority over the Public User Identity listed below it and the indicia are numbers that reflect the priority (e.g., the highest priority Public User Identity is referred to using the indicium '1', the second-highest priority Public User Identity is referred to using the indicium '2', and so on). In a hierarchical implementation, a Public User Identity to the left may have a higher priority over the one to the right. In some cases, a hashing function may be used to associate each Public User Identity with a unique identifier that is determinative of the indicium to associate with each Public User Identity. Alternatively, an explicit priority ranking may be provided wherein an indicator indicating the priority of the Public User Identities is appended or otherwise incorporated into the database structure and used as the indicium. For example, a priority value of 0 may indicate the Public User Identity having the highest priority. When there is no priority indicator provided, all Public User Identities may be assumed or interpreted to have equal priority.

In the present system, an indicium may be provided for uniquely identifying each Public User Identity listed. The highest priority Public User Identity may also be known as the default user identity or a unique Public User Identity may be provisioned that is known or identified as the default user identity. The indicium referring to each Public User Identity may be determined explicitly or implicitly (e.g., implicit when determined by the priority ordering of the Public User Identities, such as by a number assigned to each ordering position of the Public User Identities) and may be used by a network Function (e.g. a UA or network node such as a service consistency and continuity application server (SCC AS)) to signal to the corresponding function (e.g. the SCC AS or UA) the Public User Identity that is to be conveyed. For example, in one specific implementation, the first Public User Identity stored in the USIM file $EF_{IMPU}$ as defined in sub clause 4.2.4 of 3GPP TS 31.103 or the first Public User Identity stored in the OMA IMS Management Object pubic_user_identity leaf as defined in sub clause 5.16 of 3GPP TS 24.167 are defined as the default Public User Identity. In some cases, after successful registration, the Default Public User Identity may be modified, for example, as the 200OK indicating a successful response can contain P-Associated-URI that can contain a Public User identity that can then become the Default Public User Identity.

When the UA establishes an originated session, the UA includes an indicium in the session initiation request. The indicium is used in place of and identifies the Public User Identity that the UA will use to identify itself. For example, if based on positional ordering, the indicium for the first listed Public User Identity may be the number '1', and the indicium for the second listed identity may be the number '2'. FIG. 1 is an illustration of the message flow for session initiation using an I1 interface where the UA provides an indicium to the network and the indicium identifies a Public User Identity. The indicium is used to minimize a size of the message. Note that the message flow in FIG. 1 may also apply to SIP messages.

In first step 14, UA 10 initiates session origination using the I1 protocol. The I1 protocol may be used, for example, because DTM is not available, a SIP registration over Gm cannot be established, or Gm is not available. In step 16, UA 10 sends an I1 INVITE to network device 12 (e.g., an SCC AS). The I1 INVITE may include a From address that contains an indicium identifying which Public User Identity should be used to identify the device. In the example shown in FIG. 1, the indicium is equal to "1" and refers to a particular Public User Identity stored in the memory of both UA 10 and network device 12. Alternatively, the I1 INVITE may not include a From field. In that case, the indicium may be considered to have a null value. The Public User Identity identified as the default Public User Identity may be used if the From header fails to indicate a particular value. The default Public User Identity may be stored in the memory of both UA 10 and network device 12. For example, the default Public User Identity may be stored as the first entry in an Elementary File IMS Public User (EFMPU) file in an IMS Identity Module (ISIM), in an open mobile alliance (OMA) device management (DM) managed object (MO) as the first entry, or in an explicit default Public User Identity leaf. Alternatively, the default Public User Identity may be constructed from the Mobile Subscriber Integrated Services Digital Network Number (MSISDN) of the wireless device if stored in the Universal Subscriber Identity Module (USIM) EFMSISDN. If the C-MSIDSN is used, the From field may be absent from the I1 message. Similarly, if the originating address is in the SMS or USSD envelope, the From field may be absent. The FROM header name itself may not be included within the I1 message to save space or octets consumed by the text "FROM". A From address containing no indicium indicates that the default Public User Identity may be used to identify the device. The default Public User Identity may be defined, for example, as the first identity listed in the memory of UA 10 and network device 12.

As such, in one implementation, the system operates in accordance with the following rules when inspecting the contents of TO and FROM (From-id) headers: 1) if the Public User Identity to identify the originating party is the default Public User Identity, then no From-id may be included; 2) if the Public User Identity to identify the originating party is not the default Public User Identity including an identifier that identifies the Public User Identity, then that identity may be used to identify the originating Party; and 3) if an identifier cannot be derived, either a SIP URI or an E.164 number may be used by the SCC AS to identify the ICS UA.

In step 18, network node 12 receives the I1 INVITE message and decodes the message. Network node 12 identifies the underlying transport (e.g., SMS or USSD) and from there may obtain the subscriber C-MSISDN (also known as the Correlation-MSISDN). If the transport is USSD, network node 12 derives the subscriber's C-MSISDN/Public User identity from the MAP service element or an equivalent of the MAP service ISDN-Address-String in accordance with 3GPP TS 29.002. Alternatively, if SMS was used as the transport protocol, network node 12 derives the subscribers C-MSISDN/Public User identity from the MAP service element or an equivalent of the MAP Forward Short Message sm-RP-OA information element in accordance with 3GPP TS 29.002. In the later case, if the interface to the SCC AS is based upon SMPP as defined in SMS Forum Short Message Peer-to-Peer Protocol specification, for example in the "deliver_sm" PDU in the "source_addr" information element, the "service_type" information element could also be coded to indicate that this is an I1 message.

Network node 12 then identifies that a "From" information element is present in the I1 INVITE message (the message may alternatively include an I1 session creating message or an I1 session setup message where an I1 INVITE message is a I1 session setup message) and looks at the indicium associated with the From element. If no indicium is present, network node 12 uses the default Public User Identity to identify UA 10. Similarly, if no "From" field is present in the I1 INVITE message, network node 12 may be configured to use the default Public User Identity for UA 10. If an indicium is present, however, network node 12 looks up the Public User Identity corresponding to the indicium. The Public User Identity may be used to identify the services to which the user has subscribed. In addition, the determined Public User Identity may be assigned to the From header of an outgoing SIP INVITE in a table stored in memory or accessible in a database that is either local or remote to network device 12. The address may also be used in the contact header or, if there is already a SIP dialogue associated with the user as identified from the C-MSISDN which is then mapped to a corresponding Private User Identity, then that same Public User Identity for ongoing dialogue can be used and the Contact header may use the same value. In step 20, network node 12 constructs a SIP INVITE request including a P-Asserted-Identity header field set to the Public User Identity, where the Public User Identity is determined as described above. The Public User Identity may be retrieved from a database or memory. The same Public User Identity may also be used in the From header field and Contact header field.

In some cases the Public User Identify is communicated in an Identity Information Element illustrated in Table 2. The Identity Information information element may contain either a SIP URI or a telephone number (e.g. international number, national number) or an identifier value that identifies a known public identity. If the Identity Information to be used is a Tel URI or a SIP URI with URI parameter User=Phone then the Code specific fields bits 3,2, and 1 may be set to "001". If a Tel or SIP URI is identified as being globally unique identified by the presence of "+" character at the start of the digit string the Type Of Number may be considered to be in international format. Numbering Plan Identification may be set to E.164. All other formats may be considered unknown and the Type Of Number may be set to unknown and Numbering plan unknown.

TABLE 2

| 8 | 7 | 6 | 5 | 4 | 3 | 2 | 1 | Octet |
|---|---|---|---|---|---|---|---|---|
| 1 | Information Element code | | | | Code specific | | | 1 |
| | 1 | 0 | 0 | 1 | | | | |
| Information Element length (in octets) | | | | | | | | 2 |
| Information Element body | | | | | | | | 3 |
| | | | | | | | | etc. |

If the Identity Information is a SIP URI as defined in RFC 3261 e.g. SIP:username@domainname:PORT then the Code specific fields bits 3,2, and 1 may be set to "010" and may be encoded to an octet string according to UTF-8 encoding rules as specified in IETF RFC 3629 or other encoding rules.

Figure 2:
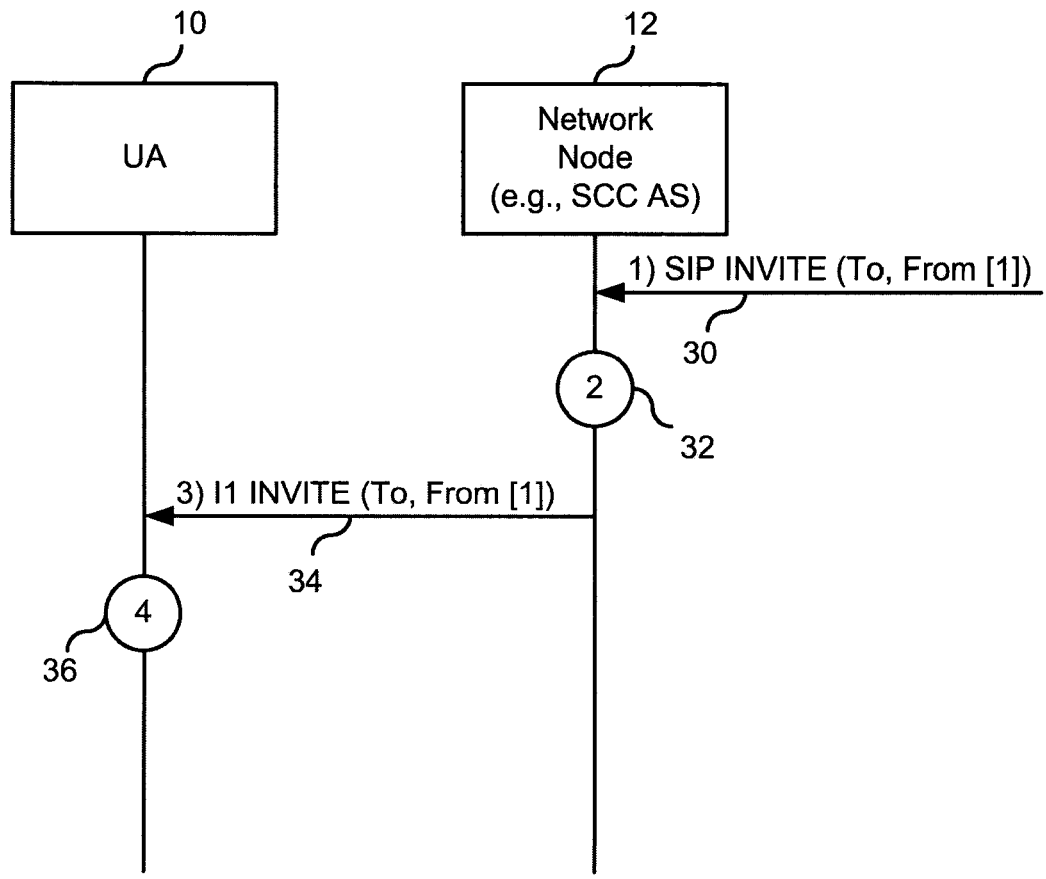
FIG. 2 is an illustration of a message flow for a UA-terminated session initiation using an I1 interface using an indicium to identify a Public User Identity.

FIG. 2 is an illustration of the message flow for UA-terminated session initiation using an I1 interface using an indicium to identify a Public User Identity. In step 30, network node 12 (e.g., an SCC AS) receives a SIP method e.g. SIP INVITE and determines that the I1 interface is to be used in communicating with UA 10. In step 32, network node 12 sends an I1 INVITE to UA 10. The I1 INVITE include a "To" address containing an indicium identifying the Public User Identity to be used to identify UA 10. The Public User Identity is taken from the incoming SIP invite and the network node 12 uses a look-up table to determine the indicium identifying that Public User Identity. Alternatively, the I1 INVITE may not include a "To" address field indicating that the default Public User Identity should be used. The default Public User Identity may be stored in the home subscriber server (HSS) or the SCC AS, for example. Alternatively, the SCC AS may retrieve the default Public User Identity from the HSS which could be the C-MSISDN or another value.

In some cases, the default Public User Identity is defined as the first Public User Identity sent in the P-Associated-URI. When the USSD message is sent, it may be necessary that the ISDN-string of the MAP Open contains the C-MSISDN and this is equivalent to the default Public User Identity. A To address containing no indicium may identify that the default Public User Identity is to be used to identify the device.

In step 34, UA 10 receives the I1 INVITE message and decodes the associated protocol. The UA may determine that a "To" information element is present and looks at the indicium contained in the To information element. If no indicium is present, UA 10 may assume that the default Public User Identity is to be used to identify the device. The default Public User Identity could be stored in the ISIM of UA 10 in the $EF_{IMPU}$ file, in an OMA DM MO as the first entry or in an explicit default Public User Identity leaf, may be received in the 200 OK P-Associated-URI (see below) when the UA initially SIP registered, or may be constructed from the MSISDN if stored in the (U)SIM $EF_{MSISDN}$, for example. Alternatively, if no "To" address field is present, a default Public User Identity may be used. If, however, an indicium is present, UA 10 looks up the value in a table stored in memory or accessible in a database that is either local or remote to find out Public User Identity that corresponds to the indicium and that should be used in the outgoing SIP INVITE. In step 36, UA 10 may display or provide some indication to the user of the Public User Identity used to address the device.

In other implementations, upon receiving an initial I1 message, an SCC AS may store the information received in the I1 Invite message, including the called party identity included in the To-id information element, the requested privacy type included in the Privacy information element, the Sequence-ID header value, and transport layer information identifying the transport connection over which the I1 Invite message was received against the IMS private identity of the originating user's UE. The IMS private identity to store the information against may be determined by comparing the C-MSISDN associated with the IMS private identity against the, MAP service ISDN-Address-String as specified in 3GPP TS 29.002 [bb] if USSD is used as the transport protocol for the message, or the MAP Forward Short Message sm-RP-OA as specified in 3GPP TS 29.002 [bb] information element if SMS is used as the transport protocol for the message. If a From header was not included, the default Public User Identity for the IMS private identity associated with the Call-ID may be stored against the I1 INVITE and used in any corresponding SIP method to identify the A party. If included, the received identifier may be mapped against the Public User Identities stored for that IMS private identity associated with the Call-ID. The mapped Public User identities retrieved may be stored against the I1 INVITE and used in any corresponding SIP method to identify the A party. If the Request-URI header field (R-URI) in the received SIP INVITE request is the default Public User Identity for the terminating UA, then the To header value may not be included. If the R-URI in the received SIP INVITE request is not the default Public User Identity for the terminating UA, then the To header may be included and shall include an identifier that maps to the Public User Identity that matches the one received in the R-URI in the SIP INVITE request.

There are several encoding mechanisms for providing the Indicium referring to a Public User Identity within SIP messages. For example, Table 3 illustrates a general mapping from Public User Identity to Indicium value or index value. The table may be stored in a memory of a UA or network device.

TABLE 3

| Public User Identity | Index (e.g., Indicium) |
|---|---|
| <tel:+1-212-555-2222> | 1 |
| <sip:user2_public1@home1.net> | 2 |

Table 4 shows an example SIP message that uses this coding scheme including an indicium referring to a Public User Identity. In some cases, the encoding scheme may conform to a URI. The URI may include a URI scheme such as hsip or csip or isip. URI schema hsip indicates that the fragment that follows the ":" is a hash value. URI schema csip indicates that the fragment that follows the ":" is a compressed value, following some mutually understood compression scheme (the compression scheme details may be exchanged using an OMA Device Management Managed Object, such as for example the IMS MO in 3GPP TS 24.167), and URI schema isip indicates the value that follows is a index mapping to, for example, a SIP or tel URI.

TABLE 4

INVITE tel:+1-212-555-6666 SIP/2.0
Via: SIP/2.0/UDP msc2.home1.net;branch=z9hG4bKnashds7
Max-Forwards: 70
Route: <sip:icscf1.home1.net:lr>

TABLE 4-continued

P-Preferred-Identity: <1> or P-Preferred-Identity: <curi:1>
P-Charging-Vector: icid-value="AyretyU0dm+6O2IrT5tAFrbHLso=023551024"; orig-ioi=home2.net
Accept-Contact: *;+g.3gpp.icsi-ref="urn%3Aurn-7%3gpp-service.ims.icsi.mmtel"
P-Access-Network-Info: 3GPP-UTRAN-TDD; utran-cell-id-3gpp=234151D0FCE11
Privacy: none
From: <sip:user2_public1@home1.net>;tag=171828
To: <tel:+1-212-555-6666>
Call-ID: f81d4fae-7dec-11d0-a765-00a0c91e6bf6
Cseq: 127 INVITE
Supported: 100rel, precondition, gruu, 199
Contact:
  <sip:user2_public1@home1.net;gr=urn:uuid:f81d4fae-7dec-11d0-a765-00a0c91e6bf6>; +g.3gpp.icsi-ref="urn%3Aurn-7%3gpp-service.ims.icsi.mmtel";+g.3gpp.ics="server"
Allow: INVITE, ACK, CANCEL, BYE, PRACK, UPDATE, REFER Another encoding would is exemplified as follows: urn:isip:12; urn:csip:JeertoE; urn:hsip:34.

Table 5 illustrates an example I1 message encoding scheme.

TABLE 5

| Information element | Type/Reference |
|---|---|
| Message Type | |
| Version Octet | |
| CallID | |
| SequenceID | |
| R-URI | |
| P-Called-ID | |
| Accept-Contact | |
| From | |
| To | |
| Other I1 elements | |

Within the I1 message illustrated in Table 5, the From header field could be constructed as illustrated in Table 6.

TABLE 6

| Information element ID - Coded to identify From | | | | | | | | |
|---|---|---|---|---|---|---|---|---|
| Bit 7 | Bit 6 | Bit 5 | Bit 4 | Bit 3 | Bit 2 | Bit 1 | Bit 0 | Length |
| Bit 7 | Bit 6 | Bit 5 | Bit 4 | Bit 3 | Bit 2 | Bit 1 | Bit 0 | Indicium |

With reference to Table 6, within the Length field, Bit 7 is a flag to indicate whether the From header contains an indicium value. Within the Indicium field, Bits 0-7 are binary encoded and the coding would map to the indicium value. Those skilled in the art will appreciate that there are other methods of identifying when the following octet contains an indicium.

In some implementations, a hashing function may be used to map a particular Public User Identity to an indicium. If a hash function is used, the hash function may be configured such that multiple entries do not evaluate to the same hash result or hash value. After inputting the Public User Identity into the hash function, the resulting hash value can be used to determine indicia to refer to the Public User Identities and may be transmitted by the UA or network device. For example, the hash values may be sorted with the resulting ordering determining an indicium to be associated with each Public User Identity.

Figure 3:
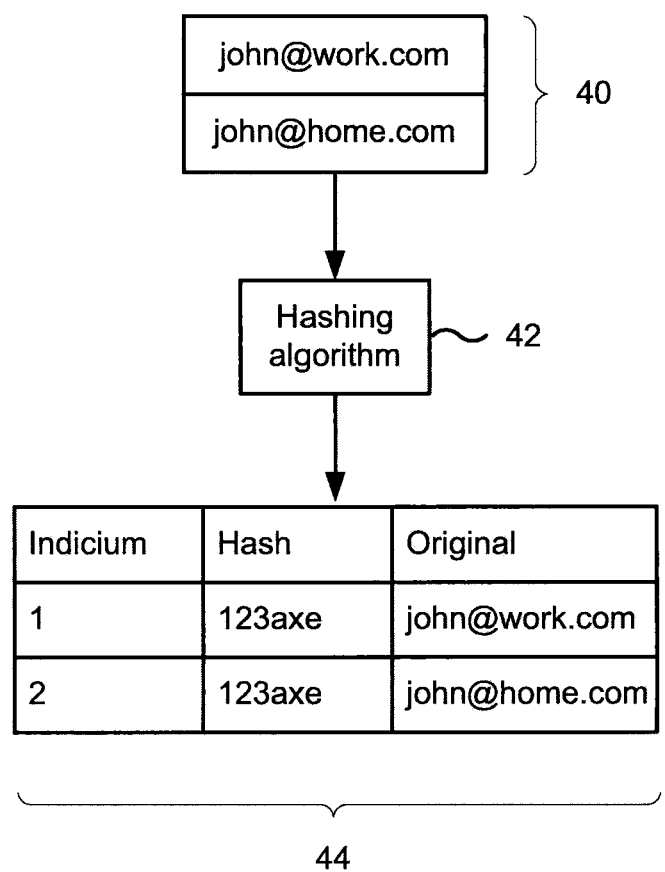
FIG. 3 is an illustration of a hash function for converting from a Public User Identity to a hash result, the hash result being smaller than the Public User Identity and used to determine an indicium for each Public User Identity.

FIG. 3 is an illustration of a hash function for converting from a Public User Identity to a hash result, the hash result being smaller than the Public User Identity and used to determine an indicium for each Public User Identity. With reference to FIG. 3, Public User Identities 40 are provided to hash function 42. Hash function 42 receives the Public User Identities and implements an algorithm to generate hash table 44. Hash table 42 associates each of the received Public User Identities with a hash value. The hash values may be arranged in numerical or alphabetical order and an indicium is mapped to each hash value and, thereby, to each Public User Identity. Both sender and receiver implement the same hashing function and use the appropriate Indicium to identify a Public User Identity when communicating.

In one implementation, the received Public User Identities are arranged in alphabetical order. Indicia may then be assigned to the Public User Identities in alphabetical order. Alternatively, the ASCII value for each part of the Public User Identity may be converted into a number. The numerical values may then be concatenated and sorted numerically to sort the Public User Identities and associate them with Indicia. For example, ABC would be 656667, while abc would be 979899 allowing the numerical results to be sorted.

In addition to simplifying SIP encoded messages by using indicia to refer to the Public User Identities of the UA, other portions of the message, such as those referring to the UA's capabilities, may also be compacted using the present method. In the case of Mobile Originated signaling, if the UA decides to send a SIP method or I1 message, the UA may consult an internal database, table, or memory to identify a mapping between a feature code or tag that the UA wishes to identify to the network. After finding the particular feature code or tag, the UA can identify a particular indicium referring to that feature tag or code and use the indicium when communicating with the network.

When the SCC AS or network node receives the SIP method or I1 message, the network node parses, decodes, or analyzes the message and discovers that the feature tags are encoded using indicia. Upon receiving the message, if the SCC AS needs to create a SIP method to another end point, the network node converts the indicia to a verbose feature code or tag using internal tables that relate each feature code or tag to a particular indicium.

Similarly, in the case of a mobile terminated transmissions, when the SCC AS (network node) receives a SIP method and needs to send a message (I1 or SIP method) to the UA, the network node analyzes the feature tags used in the message. Using tables stored in the network node's memory, the node chooses the correct indicium value to refer to that feature tag. The network node may then send the message containing the indicium value to the UA. In some cases, the feature tags may include ICSI and IARA tags. When the UA receives the SIP method or I1 message, the UA parses, decodes, or analyzes the message and discovers that the feature tags are encoded as indicia. The UA then looks up the indicia in memory to identify the particular feature code or tag associated with the indicia. The UA then performs the necessary functions per 3GPP and IETF specifications for receipt of that feature tag.

In this implementation, the feature tags and their respective indicia are provisioned to both the UA and the network node before communication between the UA and network node. Table 7 illustrates one example data structure for provisioning the feature tags and their respective indicia that may be provided to both the UA and network node.

TABLE 7

| Indicium | Feature tag |
|---|---|
| 1 | +g.3gpp.icsi-ref="urn%3aurn-7%3a3gpp-service.ims.icsi.mmtel" |
| 2 | +g.3gpp.ics="server" |

In an I1 message implementing the present method, new headers Contact Header and Accept Contact Header may be defined that are similar to the corresponding SIP headers. Thus when a UA originates an I1 INVITE message the UA may include the additional headers as shown in Table 8.

TABLE 8

| Information element ID - Coded to identify Accept Contact/Reject Contact or Contact Header | | | | | | | | |
|---|---|---|---|---|---|---|---|---|
| Bit 7 | Bit 6 | Bit 5 | Bit 4 | Bit 3 | Bit 2 | Bit 1 | Bit 0 | Length |
| Bit 7 | Bit 6 | Bit 5 | Bit 4 | Bit 3 | Bit 2 | Bit 1 | Bit 0 | Indicia |

In some cases, there may be a bit mapping to each of the feature tags, such that we could have as shown in Table 9.

TABLE 9

| Indicium Bit mapping | Feature tag |
|---|---|
| Bit 0 | +g.3gpp.icsi-ref="urn%3aurn-7%3a3gpp-service.ims.icsi.mmtel" |
| Bit 1 | +g.3gpp.ics="server" |

Table 10 illustrates an example I1 message configured in accordance with the present disclosure. As shown, the message has the capacity to provide several indicia for identifying the feature codes or tags supported by the UA or requested by the network node.

TABLE 10

| 7 | 6 | 5 | 4 | 4 | 2 | 1 | 0 | Octet |
|---|---|---|---|---|---|---|---|---|
| Protocol version number | | | | Protocol identifier | | | | 1 |
| Message ID | | | | | | | | 2 |
| R | R | Direction | Type | Message ID | | | | 3 |
| Call-Identifier (Part-1) | | | | | | | | 4 |
| Call-Identifier (Part-2) | | | | | | | | 5 |
| Message sequence number | | | | | | | | 6 |
| To Information Element | | | | | | | | |
| Optional From which could be that in Table 6 | | | | | | | | |
| Information element ID -Contact Header | | | | | | | | |
| Bit 7 | Bit 6 | Bit 5 | Bit 4 | Bit 3 | Bit 2 | Bit 1 | Bit 0 | Length Indicia |
| Bit 7 | Bit 6 | Bit 5 | Bit 4 | Bit 3 | Bit 2 | Bit 1 | Bit 0 | Indicia Octect 1 |
| Bit 7 | Bit 6 | Bit 5 | Bit 4 | Bit 3 | Bit 2 | Bit 1 | Bit 0 | Indicia Octect 2 |
| Bit 7 | Bit 6 | Bit 5 | Bit 4 | Bit 3 | Bit 2 | Bit 1 | Bit 0 | Indicia Octect 3 |
| Information element ID - Coded to identify Accept Contact | | | | | | | | |
| Bit 7 | Bit 6 | Bit 5 | Bit 4 | Bit 3 | Bit 2 | Bit 1 | Bit 0 | Length Indicia |
| Bit 7 | Bit 6 | Bit 5 | Bit 4 | Bit 3 | Bit 2 | Bit 1 | Bit 0 | Indicia Octect 1 |
| Bit 7 | Bit 6 | Bit 5 | Bit 4 | Bit 3 | Bit 2 | Bit 1 | Bit 0 | Indicia Octect 2 |
| Bit 7 | Bit 6 | Bit 5 | Bit 4 | Bit 3 | Bit 2 | Bit 1 | Bit 0 | Indicia Octect 3 |

In alternative implementations of the I1 message there may be two information elements for Contact Header and Accept Contact. Within the Contact header, a SIP contact header may be provided that contains feature tags defined within IETF, and a 3GPP contact header that contains feature tags defined in 3GPP specifications. Within the Accept Contact header, the SIP Accept contact header contains feature tags defined within IETF, and the 3GPP Accept contact header contains feature tags defined in 3GPP specifications. In some cases there may also be one or more Reject Contact header. The message may include an Accept Contact information element (IE) that may be optionally included to identify the feature tags, an ERAccept Contact IE that may be optionally included to identify feature tags that have been qualified with the feature preference Explicit or Require and/or a Reject Contact IE that may be optionally included to identify feature tags that have been qualified with the feature preference Explicit or Require. Additional tags may include an EAccept Contact IE that may be optionally included if feature tags that have been qualified with the parameter tag "explicit" are indicated, and an RAccept Contact IE that may be optionally included if feature tags that have been qualified with the parameter tag "require" are indicated. Table 12 shows an example implementation of the present system where the table identifies at a protocol level whether the information elements are mandatory (M), optional (O), format is value (v), tag length value (tlv), tag value (TV) or length value (VL) and a length.

SIP allows 'explicit' or 'required' to be appended to a feature tag to identify how explicit the mapping should be. As described below in Table 11, if such a method is required to be communicated over an I1-like protocol, the following encoding may be used:

TABLE 11

| Information element ID - Coded to identify Accept Contact Header with explicit required requirements | | | | | | | | |
|---|---|---|---|---|---|---|---|---|
| Bit 7 | Bit 6 | Bit 5 | Bit 4 | Bit 3 | Bit 2 | Bit 1 | Bit 0 | Length |
| Bit 7 Explicit | Bit 6 Require | Bit 5 | Bit 4 | Bit 3 | Bit 2 | Bit 1 | Bit 0 | Indicia + Explicit or required |

Within Table 11, Bit 7 of octet 2, if set 1, identifies for this feature tag Explicit options is set and Bit 6 of octet 2, if set 1, identifies for this feature tag Required options is set.

Table 12 is an illustration of another example SIP-encoded message encoded in accordance with the present disclosure.

TABLE 12

| Information element | Type/Reference | Presence | Format | Length |
|---|---|---|---|---|
| Protocol Information | Protocol Information See 3GPP TS24.294 section 7.2.2.1.2 | M | V | 1 |
| Message Type | Request Message - INVITE See 3GPP TS24.294 section 7.2.2.2.1.2 | M | V | 2 |
| Call ID | Call-Id See 3GPP TS24.294 section 7.2.2.1.4 | M | V | 2 |
| Message Sequence Number | Sequence-Id See 3GPP TS24.294 7.2.2.1.5 | M | V | 1 |
| To | To See 3GPP TS24.294 section 7.3.2.3 | M | LV | FFS |
| From | From See 3GPP TS24.294 section 7.3.2.4 | O | LV | FFS |

TABLE 12-continued

| Information element | Type/Reference | Presence | Format | Length |
|---|---|---|---|---|
| Accept Contact | Accept Contact Table 11d and 11c | O | TLV | 5 |
| ERAccept Contact | ERAccept Contact Table 11d and 11c | O | TLV | 3-Y |
| Reject Contact | Reject Contact Table 11d and 11c | O | TLV | 5 |

The information elements Accept Contact, ERAccept Contact and Reject Contact can be further expanded as illustrated in Table 13. Those skilled in the art will appreciate that even though the table shows one value for the information element that in this embodiment that each information element will require a separate value.

TABLE 13

| 8 | 7 | 6 | 5 | 4 | 3 | 2 | 1 | Octet |
|---|---|---|---|---|---|---|---|---|
| Information Element code | | | | | Code specific | | | 1 |
| 1 | 0 | 0 | 1 | 1 | | | | |
| Information Element length (in octets) | | | | | | | | 2 |
| Information Element body | | | | | | | | 3 |
| | | | | | | | | ..5 |

The information elements consist of an Information Element Code and Code specific value. Accept Contact, ERAccept Contact and Reject Contact could be separate information elements as shown in Table 14 as explained above or they could be all one information element using one information element code value where by the code specific information element is used to distinguish between the different headers.

TABLE 14

| I1 information element Name | Description and content (subclauses) |
|---|---|
| Error-code | See 3GPP TS24.294 section 7.4.2.2 |
| From-id | See 3GPP TS24.294 section 7.4.2.3 |
| Privacy | See 3GPP TS24.294 section 7.4.2.4 |
| SCC-AS-id | See 3GPP TS24.294 section 7.4.2.5 |
| Session-identifier | See 3GPP TS24.294 section 7.4.2.6 |
| To-id | See 3GPP TS24.294 section 7.4.2.7 |
| Replaces | See 3GPP TS24.294 section 7.4.2.8 |
| Accept Contact | See Table 13/Table 14 |
| ERAccept Contact | See Table 13/Table 14 |
| Reject Contact | See Table 13/Table 14 |

In Table 15 there is an example of how the Code specific element has been used to define 5 information elements Accept Contact, EAccept Contact, RAccept Contact ERAccept Contact and Reject Contact.

TABLE 15

(octet 1) Code specific

Bits
3 2 1

0 0 0   Accept
0 0 1   Accept - "require" parameter tag per RFC 3841
0 1 0   Accept - explicit parameter tag per RFC 3841
0 1 1   Accept - "require" and "explicit" parameter tags per RFC 3841
1 0 0   Reject
\       Other values are reserved for future use Those skilled in the art will appreciate that a combination of the Information Element Code and Code specific values could be used to define the necessary number of information elements to convey the feature tags and their optional parameter tags "explicit", "require" etc.

Table 16 is an illustration of another example SIP-encoded message encoded in accordance with the present disclosure.

TABLE 16

| Protocol version number | | | | Protocol identifier | | | | 1 |
|---|---|---|---|---|---|---|---|---|
| Message ID | | | | | | | | 2 |
| R | R | Direction | Type | Message ID | | | | 3 |
| Call-Identifier (Part-1) | | | | | | | | 4 |
| Call-Identifier (Part-2) | | | | | | | | 5 |
| Message sequence number | | | | | | | | 6 |
| To Information Element<br>Optional From which could be that in Table 6 | | | | | | | | |
| Information element ID - Contact Header | | | | | | | | |
| Bit 7 | Bit 6 | Bit 5 | Bit 4 | Bit 3 | Bit 2 | Bit 1 | Bit 0 | Length Indicia |
| Bit 7 | Bit 6 | Bit 5 | Bit 4 | Bit 3 | Bit 2 | Bit 1 | Bit 0 | Indicia Octet 1 |
| Bit 7 | Bit 6 | Bit 5 | Bit 4 | Bit 3 | Bit 2 | Bit 1 | Bit 0 | Indicia Octet 2 |
|  |  |  |  |  |  |  |  | Indicia Octet 3 |
| Information element ID - Coded to identify Accept Contact<br>e.g. Accept Contact in Table 14 | | | | | | | | |
| Bit 7 | Bit 6 | Bit 5 | Bit 4 | Bit 3 | Bit 2 | Bit 1 | Bit 0 | Length Indicia Octet 1 |
| Bit 7 | Bit 6 | Bit 5 | Bit 4 | Bit 3 | Bit 2 | Bit 1 | Bit 0 | ZZZ Indicia Octet 2 |
| Bit 7 | Bit 6 | Bit 5 | Bit 4 | Bit 3 | Bit 2 | Bit 1 | Bit 0 | Indicia Octet 3 |
| Information element ID - Coded for individual feature tag<br>requiring additional information | | | | | | | | |
| Explicit<br>1 | Require<br>0 | Feature tag value - (YYY) | | | | | | Indicium value |

Within the example SIP-encoded message illustrated in Table 16 the feature tag value (ZZZ) or the other aforementioned embodiments such as but not limited to Table 13 Information Element body, may be encoded in accordance with the example data structure illustrated in Table 17-Table 20.

The feature tag contact information element may be used by the UE to identify characteristics of the UE that are to be reached when the Code specific field bits 3,2, 1 take a value between and including "000" and "011". The ASN.1 identifiers associated with feature tags may characterize the feature set of the UE. Feature tags can be qualified by appending an option tags "explicit" and "required" as per procedures in RFC 3841]. When a feature tag appears with no qualifier, the feature tag information element with the Code specific fields bits 3,2, and 1 may be set to "000" and the decimal values may be included in the Information Element body. When a feature tag is qualified with the "require" parameter tag, the feature tag information element with the Code specific fields bits 3,2, and 1 may be set to "001" and the decimal values may be included in the Information Element body. When a feature tag is qualified with the "explicit" parameter tag, the feature tag information element with the Code specific fields bits 3,2, and 1 may be be set to "010" and the decimal values may be included in the Information Element body. When the feature tag is qualified with the "explicit" and "require" parameter tag the feature tag information element with the Code specific fields bits 3,2, and 1 may be set to "011" and the decimal values may be included in the Information Element body. The feature tag contact information element may be used by the UE to identify characteristics of the UA that are to be avoided when the Code specific field bits 3,2,1 is set to "100".

The UE may include the Feature Tag Contact element in the I1 Invite message to indicate any called feature preferences per RFC 3841. The IE can appear multiple times depending upon whether the feature tags need to be qualified with the "require" and or "explicit" parameter tags or should be identified as being rejected.

TABLE 17

(octet 3) Bit Specific

Bits 1   sip.audio as defined in RFC 3840 [zz]
2   sip.application as defined in RFC 3840 [zz]
3   sip.data as defined in RFC 3840 [zz]
4   sip.control as defined in RFC 3840 [zz]
5   sip.video as defined in RFC 3840 [zz]
6   sip.text as defined in RFC 3840 [zz]
7   sip.automata as defined in RFC 3840 [zz]
8   sip.duplex = full as defined in RFC 3840 [zz]

TABLE 18

(octet 4) Bit Specific

Bits 1   sip.duplex = half, as defined in RFC 3840 [zz]
2   sip.duplex = receive only as defined in RFC 3840 [zz]
3   sip.duplex = send only as defined in RFC 3840 [zz]
4   sip.mobility = fixed as defined in RFC 3840 [zz]
5   sip.mobility = mobile as defined in RFC 3840 [zz]
6   sip.actor = principal, as defined in RFC 3840 [zz]
7   sip.actor = attendant, as defined in RFC 3840 [zz]
8   sip.actor = msg-taker, as defined in RFC 3840 [zz]

TABLE 19

(octet 5) Bit Specific

Bits 1   sip.actor - information as defined in RFC 3840 [zz]
2   sip.isfocus as defined in RFC 3840 [zz]
3   sip.byeless as defined in RFC 3840 [zz]
4   sip.rendering - yes as defined in RFC 4235 [aa]
5   sip.rendering - no as defined in RFC 4235 [aa]
6   sip.rendering - unknown as defined in RFC 4235 [aa]
7   sip.message as defined in RFC 4569 [bb]
8   sip.ice

TABLE 20

| (octet 6) Bit Specific | |
|---|---|
| Bits | |
| 1 | Reserved |
| 2 | Reserved |
| 3 | Reserved |
| 4 | Reserved |
| 5 | Reserved |
| 6 | Reserved |
| 7 | Reserved |
| 8 | Extension |

Another embodiment on how to encode the feature tags is to take the ASN.1 decimal values defined by IANA and coded into information element.

TABLE 21

| 8 | 7 | 6 | 5 | 4 | 3 | 2 | 1 | Octet |
|---|---|---|---|---|---|---|---|---|
| Information Element code | | | | | Code specific | | | 1 |
| 1 | 0 | 0 | 1 | 1 | | | | |
| Digit 1 prefix tree | | | | Digit 2 prefix tree | | | | 2 |
| Digit 3 prefix tree | | | | Digit 4 prefix tree | | | | 3 |
| Digit 5 prefix tree | | | | Digit 6 prefix tree | | | | 4 |
| Information Element length (in octets) | | | | | | | | 5 |
| Information Element body | | | | | | | | 6 |
| | | | | | | | | ..x |

TABLE 22

(octet 1) Code specific

Bits

| 3 2 1 | |
|---|---|
| 0 0 0 | Accept |
| 0 0 1 | Accept - "require" parameter tag per RFC 3841 [xx] |
| 0 1 0 | Accept - explicit parameter tag per RFC 3841 [xx] |
| 0 1 1 | Accept - "require" and "explicit" parameter tags per RFC 3841 [xx] |
| 1 0 0 | Reject |
| \ | Other values are reserved for future use |
| | (octet 2-4) |
| | (octet 2) |
| 8 7 6 5 | the most significant digit of the network management object identifier http://www.iana.org/assignments/media-feature-tags e.g. Prefix: iso.org.dod.internet.features.ietf-tree (1.3.6.1.8.1) (octet 2) |
| 4 3 2 1 | the next significant digit of the network management object identifier (octet 3) |
| 8 7 6 5 | the next significant digit of the network management object identifier (octet 3) |
| 4 3 2 1 | the next significant digit of the network management object identifier (octet 4) |
| 8 7 6 5 | the next significant digit of the network management object identifier (octet 4) |
| 4 3 2 1 | the next significant digit of the network management object identifier (octet 6-y) |

Decimal value of the feature tag to be encoded
http://www.iana.org/assignments/media-feature-tags Table 21 shows an embodiment of using IANA ASN.1 encoding where the IANA tree is encoded in octets 2-4. This encoding provides a mechanism whereby if feature/media tags are created in the future they can be conveyed in a future proof mechanism. The feature/media tag decimal value is encoded in octet 6-y, each feature/media tag takes one octet so a list of them can be included.

In an alternative implementation, another information element can be defined so that the digit prefix are 8 bits in length, this allows for values in the tree to be maximum size of 256 e.g. 256.158.192.45.200.180

TABLE 23

| 8 | 7 | 6 | 5 | 4 | 3 | 2 | 1 | Octet |
|---|---|---|---|---|---|---|---|---|
| Information Element code | | | | | Code specific | | | 1 |
| 1 | 0 | 0 | 1 | X | | | | |
| Digit 1 prefix tree | | | | | | | | 2 |
| Digit 2 prefix tree | | | | | | | | 3 |
| Digit 3 prefix tree | | | | | | | | 4 |
| Digit 4 prefix tree | | | | | | | | 5 |
| Digit 5 prefix tree | | | | | | | | 6 |
| Digit 6 prefix tree | | | | | | | | 7 |
| Information Element length (in octets) | | | | | | | | 8 |
| Information Element body | | | | | | | | 9 |
| | | | | | | | | ..x |

Within the example SIP-encoded message illustrated in Table 16, the feature tag value (YYY) may be encoded in accordance with the example data structure illustrated in Table 24 and the example encodings provided in Table 25 in, for example, the Accept, ERAccept, or Reject Contact elements. The encoding may be bit specific, as illustrated, or may use explicit codes for mapping values to particular octet values.

TABLE 24

| (octet 3-Y) Code specific | |
|---|---|
| Bit | |
| 8 | Value 1 Explicit required |
| 7 | Value 1 Require required. |
| 6-1 | Feature Tag |

TABLE 25

| (octet -3-Y) Bit Specific | |
|---|---|
| Bits 6 5 4 3 2 1 | |
| 0 0 0 0 0 0 | sip.audio |
| 0 0 0 0 0 1 | sip.application |
| 0 0 0 0 1 0 | sip.data |
| 0 0 0 0 1 1 | sip.control |
| 0 0 0 1 0 0 | sip.video |
| 0 0 0 1 0 1 | sip.text |
| 0 0 0 1 1 0 | sip.automata |
| 0 0 0 1 1 1 | sip.duplex - full |
| 0 0 1 0 0 0 | sip.duplex - half, |
| 0 0 1 0 0 1 | sip.duplex - receive only |
| 0 0 1 0 1 0 | sip.duplex - send only |
| 0 0 1 0 1 1 | sip.mobility - fixed |
| 0 0 1 1 0 0 | sip.mobility - mobile |
| 0 0 1 1 0 1 | sip.actor -principal, |
| 0 0 1 1 1 0 | sip.actor -attendant, |
| 0 0 1 1 1 1 | sip.actor - msg-taker, |
| 0 1 0 0 0 0 | sip.actor - information |
| 0 1 0 0 0 1 | sip.isfocus |
| 0 1 0 0 1 0 | sip.byeless |
| 0 1 0 0 1 1 | sip.rendering - yes |
| 0 1 0 1 0 0 | sip.rendering - no |
| 0 1 0 1 0 1 | sip.rendering - unknown |
| 0 1 0 1 1 0 | sip.message |
| 0 1 0 1 1 1 | sip.ice |
| 0 1 1 0 0 0 | g.3gpp.cs-voice |
| 0 1 1 0 0 1 | g.3gpp.cs-video |
| 0 1 1 0 1 0 | g.3gpp.smsip |

The indicia relating to the feature codes or tags may also be encoded in accordance with SIP signaling requirements. If the UA originates a call, as part of the call the UA may wish to include a feature tag both in the Accept Contact and Contact Headers. Table 26 shows how a SIP INVITE may be coded where the feature tag indicium is underlined. The same concept may be applied to other SIP methods where traditionally you would insert the feature tag in its verbose form.

TABLE 26

INVITE tel:+1-212-555-6666 SIP/2.0
Via: SIP/2.0/UDP mgcf1.hom1.net;branch=z9hG4bKnashds7
Max-Forwards: 70
Route: <sip:icscf1.home1.net;lr>
P-Asserted-Identity: <tel: +1-212-555-1111>
P-Charging-Vector: icid-value="AyretyU0dm+6O2IrT5tAFrbHLso=023551024"; orig-ioi=home1.net
Privacy: none
From: <tel:+358-50-4821437>;tag=171828
To: <tel:+1-212-555-6666>
Call-ID: f81d4fae-7dec-11d0-a765-00a0c91e6bf6
Cseq: 127 INVITE
Supported: 100rel, precondition, gruu, 199
Accept-Contact: 1 or Accept-Contact: hash=1,2,3
P-Asserted-Service: urn:urn-7:3gpp-service.ims.icsi.mmtel
Contact:  <sip:mgcf1.home1.net>;1  or  Contact: <sip:mgcf1.home1.net>;hash=1,2,3
Allow: INVITE, ACK, CANCEL, BYE, PRACK, UPDATE, REFER
Content-Type: application/sdp TABLE 26-continued Content-Length: (...)
v=0
o=- 2987933615 2987933615 IN IP6 5555::aaa:bbb:ccc:eee
s=
c=IN IP6 5555::aaa:bbb:ccc:eee
t=0 0
m=audio 3456 RTP/AVP 97 96
b=AS:25.4
a=curr:qos local sendrecv
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone-event
a=maxptime:20

In alternative implementations, it may be necessary when using indicia in SIP methods to include a feature tag to identify that the indicium feature is being used. For example, the following method may be defined "+3gpp.indicium=[indicium values separated by comma, colon etc]". Such a feature tag may be a new feature tag or an existing one. If the feature tag is new, the tag may be created according to procedures defined in 3GPP and/or IETF and/or IANA.

Figure 4:
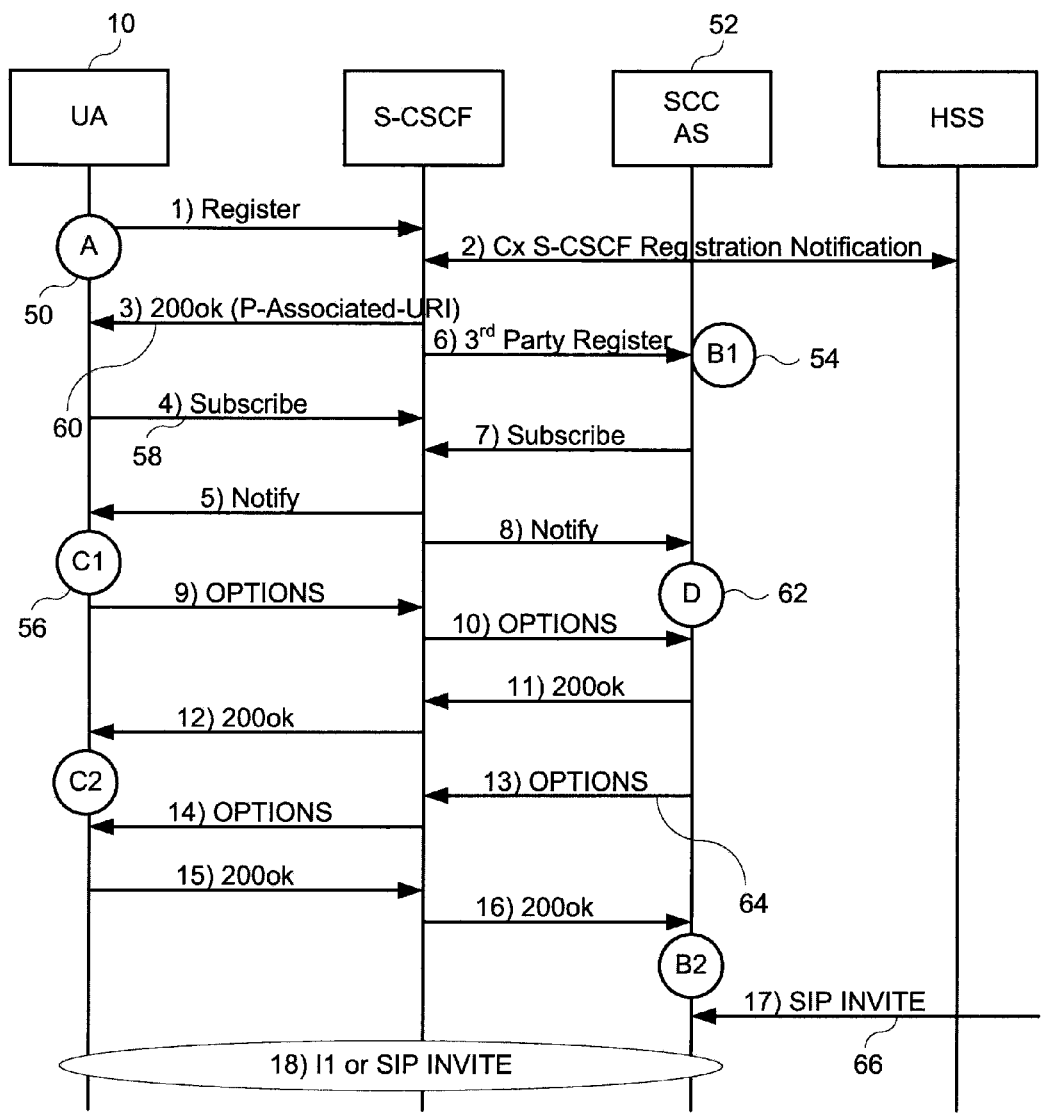
FIG. 4 illustrates a message flow for UA registration within a network.

In another implementation of the present system, rather than provide a pre-determined mapping of message values to indicia, the indicia mapping can be constructed dynamically while a UA and a network node communicate. FIG. 4 illustrates a message flow for UA registration within a network. FIG. 4 also illustrates several additional actions that take place in the network to complete the registration. Generally, the message flow shown in FIG. 4 is per various standards, however several steps within the procedure are highlighted as being susceptible to dynamic message compacting in accordance with the present disclosure. Accordingly, using the present method, the message flow shown in FIG. 4 may be modified using dynamic indicia to generate a more efficient message flow resulting in less information being communicated between the UA and the network node or nodes.

In other implementations, it may be necessary when using indicia in SIP messages to create a new body part (e.g. an XML MIME document) for inclusion in SIP messages or to enhance an existing body part such as the reevent or reginfo.

The following example illustrates how the present system may be used to dynamically create indicia for referring to Public User Identities and SIP UA capabilities within a SIP-encoded message, or a message configured to transmitted over an I1 interface. In other implementations, however, dynamic indicia may be generated for any of the data elements contained within a message. For example, in one specific implementation, all elements of a message that are encoded as Type-Length-Value (TLV) or Length-Value (LV) data elements are eligible for substitution with indicia in accordance with the present disclosure. In an LV-encoded data element, for example, a specific length of the data value is provided. A value is also provided that may include, for example, ASCII data and has a length equal to that provided in the length value. The use of LV-encoded data elements allow for efficient parsing and processing. As a result, several of the data elements encoded within a SIP message, or a message configured to be transmitted using the I1 interface may be encoded as TLV or LV-type data elements.

Referring to FIG. 4, at step 50 of the flow diagram, UA 10 has constructed a registration message to be transmitted to the network. As part of that registration message, UA 10 includes Calling capabilities. These capabilities are reflected by feature tags that are appended to the Contact Header per RFC 3840 procedures. UA 10 may indicate support of the proposed functionality using the "+3gpp.indicium" feature tag or sip.schemes=csip etc, for example. The tag may be inserted into the Contact header of a SIP REGISTER (SIP SUB-SCRIBE, other SIP Methods/message types) request during the registration procedure. UA 10 may use a Require (or Proxy-Require) header field with the value "pref" if UA 10 wants to be sure that SCC AS 52 understands the extension.

After defining the Calling capabilities within the registration message, UA 10 creates an indicium mapping which, using the examples above, may include the two feature tags included in the registration message in order and having indicia 1 and 2, respectively. For example, the indicia mapping may be that of Table 27. One skilled in the art, however, would appreciate that the numbering could start at any value. In this implementation, the number starting point and number increments between SCC AS 52 and UA 10 are the same (i.e. the same starting points, with consistent increments).

TABLE 27

| Indicium | Feature tag |
|---|---|
| 1 | +g.3gpp.icsi-ref="urn%3aurn-7%3a3gpp-service.ims.icsi.mmtel" |
| 2 | +g.3gpp.ics="server" |

Alternatively the mapping between the feature tag and indicium value can be created by sending the feature tags through a hashing function and then arranging the hash values in numerical order and assigning the indicia to the feature tags in that order, as described above for hashing the Public User Identity value.

After constructing the mapping, UA 10 transmits the registration message with the original Calling capabilities indications (i.e., not using the indicia) to the network node.

In step 54, SCC AS 52 receives a 3rd party registration from UA 10. Part of the registration could include the register message described above. The message may look like the one shown in Table 28, with the feature tags being underlined.

TABLE 28

REGISTER sip:scc_as.home1.net SIP/2.0
Via: SIP/2.0/UDP scscf1.home1.net;branch=z9hG4bK240f34.1,
  SIP/2.0/UDP [5555::aaa:bbb:ccc:ddd]
Max-Forwards: 70
From: <sip:scscf1.home1.net>;tag=21235
To: <sip:user2_public1@home1.net>
Contact: <sip: scscf1.home1.net>
Call-ID:
Expires: 600000
P-Charging-Vector:                                         icid-
  value="AyretyU0dm+6O2IrT5tAFrbHLso=023551024";           orig-
  ioi=home1.net
P-Charging-Function-Address: ccf=192.1.1.1; ecf=192.1.1.2
CSeq:
Content-Type: multipart/mixed;boundary="boundary1"
Content-Length: (...)
--boundary1
Content-Type: message/sip
REGISTER sip:ics.mnc015.mcc234.3gppnetwork.org SIP/2.0
Via: SIP/2.0/UDP icscf.home1.net;branch=z9hG4bK240f34.1,
  SIP/2.0/UDP [5555::aaa:bbb:ccc:ddd]
Max-Forwards: 69
P-Visited-Network-ID: "Visited Network Number 1 for MSC
  Server"
P-Charging-Vector:                                         icid-
  value="AyretyU0dm+6O2IrT5tAFrbHLso=023551024"
From:
  <sip:234150999999999@ics.mnc015.mcc234.3gppnetwork.org>;

TABLE 28-continued tag=4fa3
To:
  <sip:234150999999999@ics.mnc015.mcc234.3gppnetwork.org>
Contact:
  <sip:[5555::aaa:bbb:ccc:ddd]>;expires=600000;+sip.instance=
  "<urn:gsma:imei:90420156-025763-0>";+g.3gpp.icsi-
  ref="urn%3Aurn-7%3gpp-
  service.ims.icsi.mmtel";+g.3gpp.ics="server"
Call-ID: apb03a0s09dkjdfglkj49111
Authorization:                                            Digest
  username="234150999999999@ics.mnc015.mcc234.3gppnetwork.
  org ", realm=" ics.mnc015.mcc234.3gppnetwork.org ",
  nonce="", integrity-protected="auth-done", uri="sip:
  ics.mnc015.mcc234.3gppnetwork.org ", response=""
CSeq: 1 REGISTER
Supported: path, gruu
Content-Length: 0
--boundary1
Content-Type: message/sip
SIP/2.0 200 OK
Via: SIP/2.0/UDP icscf1.home1.net;branch=z9hG4bK351g45.1,
  SIP/2.0/UDP                [5555::aaa:bbb:ccc:ddd]:1357;
  branch=z9hG4bKnashds7
Path: <sip:term@msc.visited1.net;lr>
Service-Route: <sip:orig@scscf1.home1.net;lr>
From:
  <sip:234150999999999@ics.mnc015.mcc234.3gppnetwork.org>;
  tag=4fa3
To:
  <sip:234150999999999@ics.mnc015.mcc234.3gppnetwork.org>
Call-ID: apb03a0s09dkjdfglkj49111
Contact:  <sip:[5555::aaa:bbb:ccc:ddd]  >;  pub-gruu="sip:
  user2_public1@home1.net;gr=urn:uuid:f81d4fae-7dec-11d0-
  a765-00a0c91e6bf6";temp-
  gruu="sip:tgruu.7hs==jd7vnzga5w7fajsc7-
  ajd6fabz0f8g5@example.com;gr";+sip.instance="<urn:uuid:f
  81d4fae-7dec-11d0-a765-00a0c91e6bf6>";+g.3gpp.icsi-
  ref="urn%3aurn-7%3a3gpp-
  service.ims.icsi.mmtel";+g.3gpp.ics="server";expires=600000
CSeq: 1 REGISTER
P-Associated-URI:              <user2_public1@home1.net>,
  <tel:+358504821437>
Content-Length: 0
--boundary1--

Having received the message in step 54, SCC AS 52 now has a listing of the capabilities of UA 10 and can build its own mapping table. Because SCC AS 52 use the same mapping algorithm to build a table relating particular indicia to capabilities, both SCC AS 52 and UA 10 can use the indicia when referring to capabilities, minimizing an amount of data that needs to be transferred between UA 10 and the network. For example, SCC AS 52 may build the mapping shown in Table 29. At this time, SCC AS 52 and UA 10 have the same indicium values mapped to the same feature tags in tables stored in memory of both devices.

TABLE 29

| Indicium | Feature tag |
|---|---|
| 1 | +g.3gpp.icsi-ref="urn%3aurn-7%3a3gpp-service.ims.icsi.mmtel" |
| 2 | +g.3gpp.ics="server" |

In step 56, UA 10 receives a Notify message containing all the registered identities for that UA 10. Table 30 is an example Notify message containing the registered identities for UA 10, with the identities that UA 10 is known by being underlined.

TABLE 30

```
NOTIFY     sip:[5555::aaa:bbb:ccc:ddd]:1357;comp=sigcomp
  SIP/2.0
Via: SIP/2.0/UDP scscf1.home1.net;branch=z9hG4bK332b23.1
Max-Forwards: 70
From: <sip:user2_public1@home1.net>;tag=31415
To: <sip:user2_public1@home1.net>;tag=151170
Call-ID:
CSeq: 42 NOTIFY
Subscription-State: active;expires=600000
Event: reg
Content-Type: application/reginfo+xml
Contact: <sip:scscf1.home1.net>
P-Charging-Info: icid=ee36d84688fe;orig-ioi=home1.net
Content-Length: (...)
<?xml version="1.0"?>
<reginfo xmlns="urn:ietf:params:xml:ns:reginfo"
         xmlns:gr="urn:ietf:params:xml:ns:gruuinfo"
         version="1" state="full">
    <registration     aor="sip:user2_public1@home1.net"
id="a6" state="active">
        <contact id="75" state="active" event="created">
            <uri>sip:[5555::aaa:bbb:ccc:ddd]</uri>
    <allOneLine>
            <unknown-param name="+sip.instance">
    "<urn: gsma:imei:90420156-025763-0>"
    </unknown-param>
            <unknown-param       name="+g.3gpp.icsi-
ref"><urn:urn-7:3gpp-service.ims.icsi.mmtel>"
    </unknown-param>
            <unknown-param
name="+g.3gpp.ics"><server>" </unknown-param>
    </allOneLine>
    <allOneLine>
            <gr:pub-gruu
uri="sip:user2_public1@home1.net
  ;gr=urn:uuid:f81d4fae-7dec-11d0-a765-00a0c91e6bf6
gr=urn:uuid:f81d4fae-7dec-11d0-a765-00a0c91e6bf6"/>
    </allOneLine>
    <allOneLine>
            <gr:temp-gruu
uri="sip:tgruu.7hs==jd7vnzga5w7fajsc7-
ajd6fabz0f8g5@home1.net
  ;gr" first-cseq="54301"/>
    </allOneLine>
        </contact>
    </registration>
    <registration     aor="tel:+358504821437"     id="a7"
state="active">
        <contact id="77" state="active" event="created">
            <uri>sip:[5555::aaa:bbb:ccc:ddd]</uri>
        </contact>
    </registration>
</reginfo>
```

After receiving the Notify message, UA 10 creates a table that maps indicia values to the received Public User Identities. As above, the starting number for the indicia is not important, only that UA 10 and SCC AS 52 use the same algorithm to map a particular identity to a particular indicium. For example, Table 31 is an illustration of an example mapping table that may be generated by UA 10 after receiving the Notify message illustrated in Table 30.

TABLE 31

| Indicium | Public identity |
|---|---|
| default | sip:user2_public1@home1.net, tel:+358504821437 |
| 1 | sip:user2_public1@home1.net |
| 2 | sip:tgruu.7hs==jd7vnzga5w7fajsc7-ajd6fabz0f8g5@home1.net |

Alternatively, the mapping between the Public User Identities and indicium value can be created by sending the user identities through a hashing function and then arranging the hashed values in numerical order and assigning the indicia in that order, as described above. Or, as described earlier they could be arrange in alphanumeric order and the indicia created using that ordering.

In some cases, UA 10 does not subscribe to the Reg Event package as shown in step 58 of FIG. 4, but uses the information received in step 60 in the P-Associated URI to create the indicia. A parameter or field could also be appended. For example, the P-Associated URI may include: "P-Associated-URI: user2_public1@home1.net, URI-index=1, <tel:+358504821437>, URI-index=2." Where "URI-index=" is the added parameter that identifies the indicia value.

In step 62, SCC AS 52 uses the same algorithm as implemented within UA 10 to build a mapping table to relate indicia to the Public User Identities received in the Notify message. For example, SCC AS 52 constructs the mapping table shown in Table 32. With both the UA 10 and SCC AS 52 having a defined mapping of indicia to Public User Identities of UA 10, both entities can use those values rather than the Public User Identities when communicating.

TABLE 32

| Indicium | Public identity |
|---|---|
| default | sip:user2_public1@home1.net, tel:+358504821437 |
| 1 | sip:user2_public1@home1.net |
| 2 | sip:tgruu.7hs==jd7vnzga5w7fajsc7-ajd6fabz0f8g5@home1.net |

Alternatively, the mapping between the Public User Identities and indicia values can be created by sending the Public User Identities through a hashing function and then arranging the hashed value in numerical order and assigning the indicia to that Public User Identities when arranged in that order, as described above. Or, as described earlier they could be arranged in alphanumeric order with the indicia being determined based upon that ordering.

Alternatively, a new SIP URI parameter could be defined that is appended to the URI in a RegEvent package. The URI could be configured to identify the indicium value for that Public User Identity, ensuring that the UA obtains an explicit indication of the position that the SIP/tel URI should take in its indicium mapping table. In a further implementation, the UA may also SIP SUBSCRIBE to Reg Event package for itself from the SCC AS. This information flow may be the same as that shown in FIG. 4, but with the SCC AS being the terminating point for the SUBSCRIBE and the originator of the NOTIFY to the UA. Because the SCC AS has already created an indicia table, the SCC AS may ensure that the order of Public User Identities in the Notify message are in the same order so that when the UA receives them they map accordingly. Another way to implement the above is to use the hashing function on a dynamic basis, whereby the Public User Identities are put through a hashing algorithm ensuring that when the resulting hash values are sorted, the ordering of the Public User Identities and associated indicia are consistent.

In an alternative implementation, after step 56, UA 10 may need to determine whether the network (e.g., network node SCC AS 52) supports the new URI scheme that makes use of indicia. In that case, UA 10 may be configured to send a SIP OPTIONS request to the network. The network may then respond, including a sip.extensions feature tag that specifies whether the network supports the present URI scheme. If UA 10 receives the indication that the encoding scheme is supported, the UA may then use the encoding scheme. Furthermore, at step 64 of FIG. 4, if SCC AS 52 did not receive a feature tag, SCC AS 52 may send an OPTIONS request to UA 10 to determine whether the new encoding schemes are supported. The response may be signaled back by UA 10 using the sip.extensions feature tag.

With reference to the message flow illustrated in FIG. 4, the generation of the indicia and mappings can take place at any of the steps listed in the diagram given the necessary data. Furthermore, referring to step 66, after the indicia mapping has been setup by UA 10 and the network, the mapping may be used in either SIP or I1 messages.

In the example illustrated in FIG. 4, a mobile terminated session establishment message flow has been shown however it will be appreciated that a Mobile originated session may be initiated using the present indicia mapping method.

At some point during the communication between UA 10 and the network, it may be necessary to reset the indicia maps (e.g., the maps may become out-of-sync). Accordingly, in one implementation, the UA may initiate a refresh using the UA's SIP REGISTER request or request for a method. Alternatively, when either the SCC AS or UA wishes to refresh the indicia mapping, in the next message communicated between the SCC AS and the UA, the entity sends a message including a feature tag, XML body, or P-Header Value specifying that the indicia values are to be reestablished/reset. While requesting the reset, the requesting entity may revert back to the original encoding of the data. Alternatively, the new data element may not be included in a message, so that when a function (e.g., SIP UAs, UAC) receives the verbose version of the data (i.e., a message that doesn't use the indicia and instead uses the original values) or an explicit indication that indicia mapping is to be reset, the receiving entity may be configured to regenerate the data in the same manner as the indicia data was originally generated. In some cases, however, either entity may indicate that a different algorithm should be used to generate the indicia data, or another network node or device may inform the entities (e.g., UA and SCC AS) of a new algorithm to use. Until such time as the data has been reconstructed, the SIP dialogue may continue using the verbose scheme.

Figure 5:
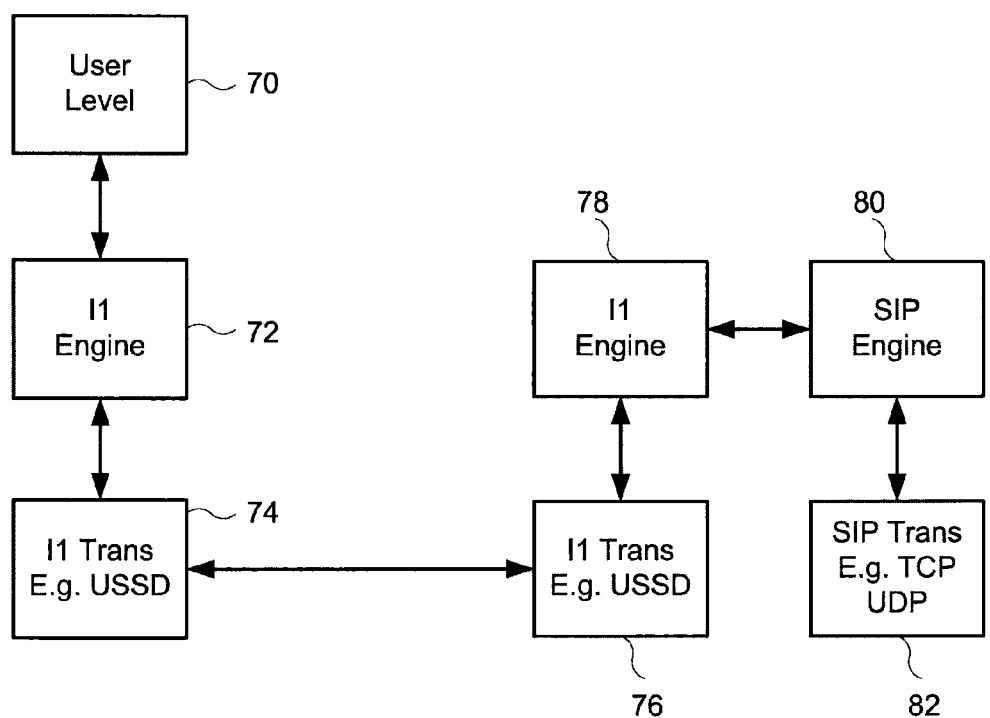
FIG. 5 illustrates a stack information flow wherein the target device is addressed using tel URI or SIP URI user=phone.

In some networks, the called or calling party may be addressed using a tel URI or a SIP URI with SIP URI parameter user=phone. In other words, the party may be addressed using a telephone number. In one implementation of the present system, when a network Function receives such an address, the Function is configured to translate the address into binary representation of an E.164 number. For example, FIG. 5 illustrates a stack information flow wherein the target device is addressed using tel URI or SIP URI user=phone. With reference to FIG. 5, at step 70, if a tel URI or SIP URI user=phone address has been chosen by the user, the address is passed to I1 engine 72. I1 engine or state machine 72 takes the input including the tel URI or SIP URI user=phone message and adapts it to the I1 protocol. The adapted message is then put into the I1 transport 74. Accordingly, at step 72, upon receipt of a tel URI or SIP URI user=phone, the UA codes the numbers in accordance with existing specifications. The message can then be received by the network at step 76, passed to the I1 engine 78 and eventually communicated to the SIP engine 80. After receiving the address for the target device, the SIP engine 80 can initiate SIP transmissions using, for example, transfer control protocol (TCP) or user datagram protocol (UDP) in step 82.

As an example, Table 33 illustrates a coding for the tel URI or SIP URI user=phone that may be performed at step 72 of FIG. 5.

TABLE 33

| 8 | 7 | 6 | 5 | 4 | 3 | 2 | 1 | |
|---|---|---|---|---|---|---|---|---|
| | | Called party BCD number IEI | | | | | | octet 1 |
| | | Length of called party BCD number contents | | | | | | octet 2 |
| 1 ext | | type of number | | | Numbering plan identification | | | octet 3 |
| | Number digit 2 | | | | Number digit 1 | | | octet 4* |
| | Number digit 4 | | | | Number digit 3 | | | octet 5* |
| | 2) | | | | | | | ⋮ |

If, as a result of parsing the tel URI or SIP URI with "user" URI or SIP parameter set to "phone", the message includes a "+" sign in the number, then the number may be coded as a Type of Number (TON) international and the digits may be encoded into the Number digits of the number using binary coded decimal (BCD). The numbering plan indicator shall be set as in E.164. If a "+" sign cannot be discovered then the number may be encoded as TON=unknown, NPI=unknown. The tel URI may also include an SCC AS PSI DN—a tel URI or SIP URI with the "user" SIP URI parameter set to "phone", in accordance with 3GPP TS 23.003. In that case, the header of the SCC AS PSI DN may be encoded in accordance with Table 34 and the body may be encoded in accordance with Table 35. Referring to Table 34 and Table 35, the number digit(s) in octet 4 precedes the digit(s) in octet 5 etc. The number digit which would be entered first is located in octet 4, bits 1 to 4. Also, if the called party BCD number contains an odd number of digits, bits 5 to 8 of the last octet may be filled with an end mark coded as "1111".

TABLE 34

| 8 | 7 | 6 | 5 | 4 | 3 | 2 | 1 | Octet |
|---|---|---|---|---|---|---|---|---|
| Information Element code | | | | | Code specific | | | 1 |
| 1 | 0 | 1 | 0 | 1 | | | | |
| Information Element length (in octets) | | | | | | | | 2 |

TABLE 35

| 8 | 7 | 6 | 5 | 4 | 3 | 2 | 1 | Octet |
|---|---|---|---|---|---|---|---|---|
| 1 ext | | type of number | | | Numbering plan identification | | | octet 3 |
| | Number digit 2 | | | | Number digit 1 | | | octet 4* |
| | Number digit 4 | | | | Number digit 3 | | | octet 5* |
| | 2) | | | | | | | ⋮ |

In a mobile originated transmission, the called address may be a tel URI SIP URI user=phone with digits encoded per 3GPP TS 24.008 section 10.5.4.7 for the To field in the I1 INVITE. The calling address may be a tel URI SIP URI user=phone put digits encoded per 3GPP TS 24.008 section 10.5.4.7 for the From field in the I1 INVITE. In a mobile terminated transmission, the called address may be a tel URI SIP URI user=phone encoded per 3GPP TS 24.008 section 10.5.4.7 for the To field in the I1 INVITE. The calling address may be a tel URI SIP URI user=phone encoded per 3GPP TS 24.008 section 10.5.4.7 for the From field in the I1 INVITE.

In a general implementation of the present system, all data having a string data type within a message is eligible for compacting in addition to the Public User Identity, and UA capabilities described above. The present system may be configured to substitute all data having a string data-type in a protocol message with an indicium that may include an integer, binary, hex, etc. value to reduce the size of the message. In one specific implementation, all data within a SIP message or SIP-like encoded message is eligible for replacement with indicium values, however in some cases only a subset of the data is eligible. For example, in one implementation, only data encoded using LV or TLV encoding methods is subject for replacement with indicia in accordance with the present disclosure.

The present system allows a client/server Application Protocol such as SIP or I1 to send an optimized string data-type, and/or references or indicia to the strings, and synchronize the reference numbers or indicia to strings on the String Sender and String Receiver sides. In this description, String Sender and String Receiver are logical entities of the proposed mechanism and may include, for example, applications running on a UA and a network node such as an SCC AS. In some cases, an application may have multiple String Sender and Receiver instances.

A String Sender, when it starts up, issues a synchronization request to a corresponding String Receiver. After receiving the synchronization request, the String Receiver checks for an existence of a synchronization table associated with the corresponding String Sender instance and, if the table exists, sends the table back in the response. If, however, the table does not exist, the response may contain a null value indicating that the table does not exist and the new table has been created. The synchronization table is a data structure that may be stored in a memory in communication with the String Sender and String receiver. The table links string values with reference numbers or indicia to the strings. The synchronization table can be shared between multiple String Sender/Receiver instances. In some implementations, the synchronization table containing the strings and their associated indicia may be pre-provisioned in the device and in the network as described above.

The String Sender and String Receiver may also be configured to send a reset request. The reset request instructs the other party to erase content of the synchronization table. The request may result in a full erasure of the synchronization table, or may specify that only particular values, or portions of the table should be erased. In response to the reset request, the receiving party can indicate a status of the operation (e.g., Success, Failed, Unknown, etc).

Figure 6:
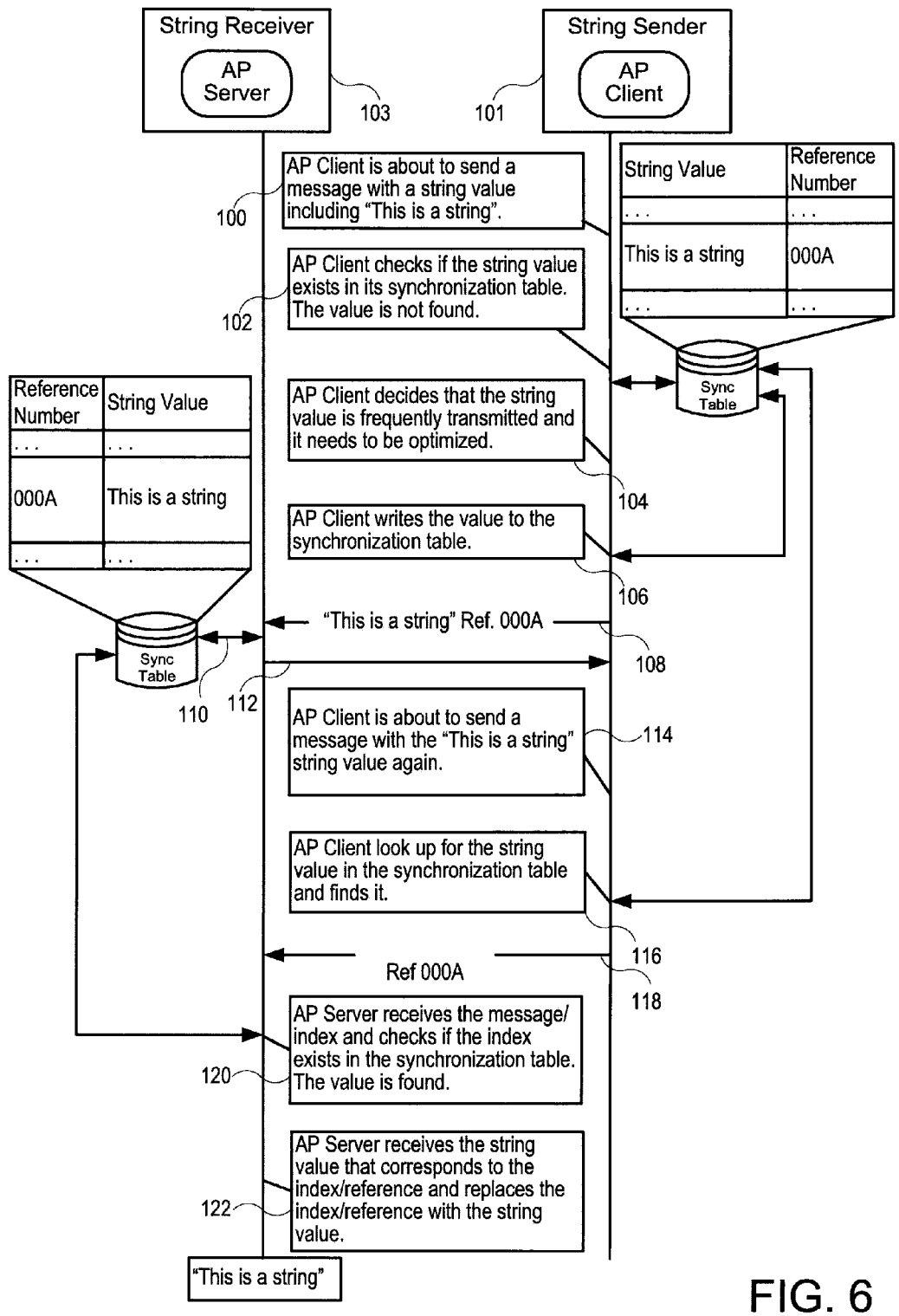
FIG. 6 is an illustration of an example message flow for optimizing string communications between a String Sender and a String Receiver entity.

FIG. 6 is an illustration of an example message flow for optimizing string communications between a String Sender and a String Receiver entity. In a first step 100, AP Client 101 (in this case, a String Sender) prepares to send a message to a String Receiver. AP Client 101 may include, for example, an application running on a UA or network node, such as an SCC AS. The message includes several strings that may be eligible for optimization by replacing the strings with indicia. AP Client 101 steps through each string to determine whether it is eligible for compression. For example, in step 102, AP Client 101 may check whether a first string value contained within the message is already described in the AP Client's synchronization table. In this example, the message includes a string value "This is a string" that is not found in the synchronization table. In step 104, AP Client 101 also determines that the string value is frequently transmitted and that the string value is suitable for optimization. Accordingly, in step 106 AP Client 101 instructs the synchronization table to store the string value "This is a string". The string value is assigned a reference value or indicium within the synchronization table.

After transmitting the message storing the string value in the synchronization table, AP Client 101 retrieves a reference number or indicium for that string value from the synchronization table.

Table 36 illustrates a portion of an example synchronization table storing a string and a reference number or indicium associated with that string that may be accessible to AP Client 101. Using the synchronization table, an AP Client, rather than transmit a string value that is already stored in the table, may be able to transmit only the reference number or indicium (assuming that the recipient has a record associating the correct string with the reference number or indicium).

TABLE 36

| Value | Reference |
|---|---|
| ... | ... |
| "This is a string" | 000A |
| ... | ... |

In step 108, AP Client 101 sends a message to AP Server 103 (String Receiver) and, in the message, identifies the string as being a candidate for optimization. AP Server 103 may include, for example, an application running on a UA or network node, such as an SCC AS. In addition to the string data itself, AP Client 101 transmits the reference number or indicium (000A) that will be used in place of the string in future transmissions. The reference number or indicium may be appended to the string, included as a part of the message headers or body, sent out of band (e.g., using another protocol and/or a different bearer), or transmitted using other options (e.g. in HTTP protocol).

In step 110, AP Server 103 retrieves the message, determines that the message includes a string and that an indicium has been provided for that string, and stores the string and indicium to its own synchronization table, as shown in Table 37.

TABLE 37

| Reference | Value |
|---|---|
| 000A | "This is a string" |

At this time, both AP Client 101 and Server 103 synchronization tables are synchronized and have stored the same string/indicium pairs. In step 112, AP Server generates a response to the message received from AP Client. In the response, AP Server 103 may indicate whether the synchronization operation was successful. AP Client 101, upon receiving the response, may check the status of the operation and, if the operation failed, AP Client 101 may remove the string from its synchronization table.

In step 114, AP Client 101 prepares to send a message that includes the same string (e.g., "This is a string") that was originally stored in the synchronization table in step 106. Note: step 114 may occur some time after the strings were originally stored in the synchronization table—many other messages may have been transmitted between AP Client 101 and AP Server 103 between steps 106 and 114 illustrated in FIG. 6. In step 116, AP Client 101 looks up the string value in the synchronization table and in step 118 inserts the reference number or indicium that corresponds to the string into the message. The message is then sent to AP Server 103. In this example, the size of the reference number or indicium in the message is 2 bytes.

In step 120, AP Server 103 receives the message and reference number or indicium, and checks whether the reference number or indicium already exists in the synchronization table. In the example, the reference number or indicium is found. In step 122, AP Server 103 retrieves the string value that corresponds to the reference number or indicium and replaces the reference number or indicium with the string value.

Using the method illustrated in FIG. 6, the contents of a message such as a SIP-like encoded message can be compacted and more efficiently transmitted between one or more components of a wireless communications network. Table 38 illustrates an example SIP-like encoded message before being compacted using the method illustrated in FIG. 6. The example message has a size of 449 bytes.

TABLE 38

DOORS [ INVITE ]
Call-Id: 7613395554492591434
C-Seq: 1
From: "BASIL"<DOORS:82513313@HOME.net>
To: <DOORS:81013313@rim.net>
App-Id: DOORSVOIP
Content-Type: application/sdp
DOORS Uid:1772631787
body [ 0 ]
v=0
o=82513313 438116720 652384295 IN IP4 192.168.1.50
s= VoIP Session
c=IN IP4 192.168.1.50
t=0 0
m=audio 51116 RTP/AVP 8 0 18 101
a=sendrecv
a=rtpmap:8 PCMA/8000
a=rtpmap:0 PCMU/8000
a=rtpmap:18 G729/8000
a=fmtp:18 annexb=no
a=rtpmap:101 telephone-event/8000
a=ptime:20

Table 39 illustrates an example SIP-like encoded message that has been compacted using the method illustrated in FIG. 6. Several of the strings contained within the message have been replaced with indicia or reference numbers that are shorter than the original strings. The size of the example compacted message is only 94 bytes—a reduction in size of 79%.

TABLE 39

DOORS [ INVITE ]
Call-Id: 0000
C-Seq: 1
From: 0001
To: 0002
App-Id: 0003
Content-Type: 0004
DOORs Uid:1772631787
body [ 0 ]
0005
0006
0007
0008
0009
000A
000B
000C
000D
000E
000F
0010
0011

Accordingly, in various implementations of the present system, if an ICS UA capable of using the I1 interface registers with the IMS CN Subsystem, the UA may associate keys with Public User Identities. A Public User Identity can be derived if at least one key is associated with a Public User Identity. When an ICS UE establishes a session control channel using the I1 reference point or when a UE generates, for example, an I1 Invite message, the I1 message includes an IE value (e.g. the From header-id IE) that includes a value as follows. If the public identity indicates the default public user identity, the value is set to the Identity Information IE (see Table 42) Code Specific IE is set to Unspecified (see Table 43) and the length IE is set to 0. If a correlated SIP INVITE request exists and the public identity indicates the public user identity used in the correlated SIP INVITE request, the Identity Information IE (see Table 42) Code Specific IE is set to indicate that the public identity is retrieved from a corresponding SIP session or correlated SIP INVITE request. For example, when indicating that the public identity is retrieved from a corresponding SIP session or correlated SIP INVITE request, the Identity Information IE (see Table 42) Code Specific IE may be set to indicate Unspecified (see Table 43) and the length IE is set to 1 and the octet is set to all '0's. If the public identity is not the default public user identity and the public user identity indicated can be derived, the system sets the value to the Identity Information (IE) (see Table 42) Code Specific IE is set to identifier (see Table 43) and the length IE is set to the length of the key. If an identifier cannot be derived, set the Identity Information IE (see Table 42) Code Specific IE is set to either a SIP URI (see Table 43) or an International E.164 number (see Table 43), and it will be used by the SCC AS to identify the ICS UE.

TABLE 40

| Information element | Type/Reference | Presence | Format | Length |
|---|---|---|---|---|
| Protocol Information | Protocol Information See 3GPP TS 24.294 section 7.2.2.1.2 | M | V | 1 |
| Message Type | Request Message - INVITE See 3GPP TS 24.294 section 7.2.2.2.1.2 | M | V | 2 |
| Call ID | Call-Id See 3GPP TS 24.294 section 7.2.2.1.4 | M | V | 2 |
| Message Sequence Number | Sequence-Id See 3GPP TS 24.294 section 7.2.2.1.5 | M | V | 1 |
| To | To See table 29 | M | LV | FFS |
| From | From See table 29 | M | LV | FFS |

TABLE 41

| Information element | Type/Reference | Presence | Format | Length |
|---|---|---|---|---|
| Protocol Information | Protocol Information See 3GPP TS 24.294 section 7.2.2.1.2 | M | V | 1 |

TABLE 41-continued

| Information element | Type/Reference | Presence | Format | Length |
|---|---|---|---|---|
| Message Type | Request Message - INVITE See 3GPP TS 24.294 section 7.2.2.2.2.2 | M | V | 2 |
| CallID | Call-Id See 3GPP TS 24.294 section 7.2.2.1.4 | M | V | 2 |
| Message Sequence Number | Sequence-Id See 3GPP TS 24.294 section 7.2.2.1.5 | M | V | 1 |
| From | From See table 29 | M | LV | FFS |
| SCC AS PSI DN | SCC AS PSI DN | M | LV | 3-15 |
| To | To See table 29 | M | LV | FFS |

If an ICS UE receives an I1 Invite message from the SCC AS and the UE determines that no I1 session exists for the received Call-Identifier value, the ICS UE may operate in accordance with the following rules. If the To header value (see Table 41) in the I1 Invite message as coded by an Identity Information IE (see Table 42) contains the Code Specific Information element set to Unspecified (see Table 43) and a length IE set to 0 then the Public user identity may be set to the default public user identity. If the To header value (see Table 41) in the I1 Invite message as coded by an Identity Information IE (see Table 42) contains the Code Specific Information element set to Unspecified (see Table 43) and the length IE is set to 1 and octet 3 is set to all '0's, then the public user identity of the UE may be set to the public user identity used in the correlated SIP INVITE request. For example, if a correlated SIP INVITE request exists and the public identity indicates the public user identity used in the correlated SIP INVITE request, the Identity Information IE (see Table 42) Code Specific IE is set to indicate that the public identity is retrieved from a corresponding SIP session or correlated SIP INVITE request. When indicating that the public identity is retrieved from a corresponding SIP session or correlated SIP INVITE request, the Identity Information IE (see Table 42) Code Specific IE may be set to indicate Unspecified (see Table 43) and the length IE is set to 1 and the octet is set to all '0's. If the To header value (see Table 41) in the I1 Invite message as coded by an Identity Information IE (see Table 42) contains the Code Specific Information element set to "identifier" (see Table 43) and a length IE set to 4 or another appropriate value, then the public user identity can be derived and may be set to the identifier value received in the information Element body of the To header. If the To header value (see Table 41) in the I1 Invite message as coded by an Identity Information IE (see Table 42) contains the Code Specific Information element set to International number (see Table 43) or SIP URI (see Table 43), then the public user identity of the UE may be set to the Identity in the Information element body of the To header value. Note that the UE may indicate the Public user identity used to address the UE in the incoming session to the user.

Upon receiving an initial I1 Invite message from the ICS UE via the I1 reference point, the SCC AS may store the information received in the I1 Invite message. In that case, the information received in the I1 message may be saved with a subscriber in the network node, for example, the SCC AS. In one embodiment, the transport layer contains a public user identity such as an MSISDN, C-MSISDN, SIP URI, or Tel URI. As the subscriber profile retrieved from the HSS contains the relevant public user identities, the incoming I1 message can be correlated with the subscriber profiles and the correct profile can be identified. For example, a C-MSISDN may be used as the public user identity in the transport layer protocol (e.g., in the MAP service ISDN-Address-String as specified in 3GPP TS 29.002 if USSD is used as the transport protocol for the message, or the MAP Forward Short Message sm-RP-OA as specified in 3GPP TS 29.002 information element if SMS is used as the transport protocol for the message). Similar information elements maybe present in other transport protocols that are used to communicate the I1 message to the SCC AS. The MSISDN may then be correlated with the MSISDNs that have been stored against subscriber profile downloaded from the HSS into the SCC AS. As the MSISDN is usually unique in the CS domain, the MSISDN can be used to correlate the incoming message with subscriber profiles. The data received in the I1 message may then be stored against the correct subscriber profile. In that case, the subscriber profile may be identified by the subscriber private identity which is either IMS private identity or IMSI.

If the From header value (see Table 40) in the I1 Invite message as coded by an Identity Information IE (see Table 42) contains the Code Specific Information element is set to Unspecified (see Table 43) and the length IE is set to 0 the default Public User identity may be stored against the I1 Invite. If the From header value (see Table 40) in the I1 Invite message as coded by an Identity Information IE (see Table 42) contains the Code Specific Information element is set to Unspecified (see Table 43) and the length IE is set to 1 and octet 3 is set to all '0's, then the public user identity of the UE may be set to the public user identity used in the correlated SIP INVITE request. If the From header value (see Table 40) in the I1 Invite message as coded by an Identity Information IE (see Table 42) contains the Code Specific Information element is set to identifier (see Table 43) and the length IE is set to 1, the received identifier as derived in paragraph 00120, for example, may be stored against the I1 Invite. If the From header value (see Table 40) in the I1 Invite message as coded by an Identity Information IE (see Table 42) contains the Code Specific Information element is set to set to International number or SIP URI the Identity contained in the Information element body of the To header value may be stored against the I1 Invite.

If the R-URI in a received SIP INVITE request is the default Public User Identity as derived in paragraph 00120, for example, for the terminating UE then the Identity Information IE (see Table 42) Code Specific Information element may be set to Unspecified (see Table 43) and the length IE is set to 0. However, If the R-URI in a received SIP INVITE request is the public user identity of the UE used in the correlated SIP INVITE request, the Identity Information IE (see Table 42) Code Specific Information element may set to Unspecified (see Table 43) and the length IE is set to 1 and octet 3 is set to all '0's. If the R-URI in a received SIP INVITE request is not the default Public User Identity for terminating UE but matches one of the public user identities then the Identity Information IE (see Table 42) Code Specific Information element may be set to identifier (see Table 43) and the length IE may be set to 1 and the Information Element body of the To header may be the identifier value that was derived (see paragraph 00120 for example) and maps to the Public User Identity that was received in the R-URI in the SIP INVITE request.

In the present system, the Identity Information specifies a public user identity such as the identity of the calling user, e.g., the calling party number (in that case, the From-id information element may contain either as an E.164, Identifier or a SIP URI), or the identity of the called user, e.g., the called party number. The Identity information element may contain either an E.164, a SIP URI or a identifier that identifies a public user identity to be used (see paragraph 00120 for example). The position of the information element in the message and direction it was received in identifies if the element is the calling or called parties identity.

The SCC-AS-id information element (see, for example, Table 45) may contain a URI including an International E.164 number representation of the SCC AS PSI DN that points to the SCC AS. When the UE sets up a CS bearer connection by sending a SETUP message to the MSC server, the UE specifies the respective International E.164 number URI as the called party number. Subsequently the call will be routed to the respective SCC AS via a MGCF where the SCC AS PSI DN will be treated as a wildcard PSI as specified in 3GPP TS 23.003 [cc] subclause 13.5 in the IMS network.

In the present system the Identity Information information element may be used to transport a public identity e.g. To party, From Party etc. The Identity Information information element may contain a SIP URI or a telephone number (e.g. international number, national number) or an identifier value that identifies a known public identity. The Code specific field, i.e., the bits 3,2, and 1 of the octet number 1 specify the type of information contained in the Identity Information information element.

If the Identity Information to be used is a tel URI or a SIP URI with URI parameter User=Phone then the Code specific fields bits 3,2, and 1 shall be set to "001" and the Identity shall be encoded per subclause 7.3.2.Y.3. If a tel or SIP URI is identified as being globally unique identified by the presence of "+" character at the start of the digit string the Type Of Number may be considered to be in international format. Numbering Plan Identification may be set to E.164. All other formats may be considered unknown and the Type Of Number shall be set to unknown and Numbering plan unknown.

If the Identity Information is a SIP URI username@domainname, the Code specific fields bits 3,2, and 1 may be set to "010" and may be encoded to an octet string according to UTF-8 encoding rules as specified in IETF RFC 3629.

Table 42 illustrates an example Identity Information information element.

TABLE 42

| 8 | 7 | 6 | 5 | 4 | 3 | 2 | 1 | Octet |
|---|---|---|---|---|---|---|---|---|
| Information Element code | | | | | Code specific | | | 1 |
| 1 | 0 | 0 | 1 | 1 | | | | |
| Information Element length (in octets) | | | | | | | | 2 |
| Information Element body | | | | | | | | 3 |
| | | | | | | | | etc. |

Table 43 illustrates an example Identity Information information element.

TABLE 43

(octet 1) Code specific

| Bits | |
|---|---|
| 3 2 1 | |
| 0 0 0 | Unspecified |
| 0 0 1 | International number, i.e. E.164 number (Note 1) |
| 0 1 0 | SIP URI |

TABLE 43-continued (octet 1) Code specific

| Bits | |
|---|---|
| 0 1 1 | Identifier (See paragraph 00120 for example) Other values are reserved for future use (octet 3) E.164 Address |
| | Encoded as specified in subclause 7.3.2.Y.3, see Table 45 (octet 3) SIP URI |
| 4 3 2 1 | The URI shall be encoded to an octet string according to UTF-8 encoding rules as specified in IETF RFC 3629 (octet 3-6) Identifier |
| | Contains four octets body coded with identifier value that identifies the public user identity as derived in one example illustrated in paragraph 00120 (octet 4) |

In the present system, the SCC-AS-id information element may contain an International E.164 Number representation of the SCC AS PSI DN that points to the SCC AS. The SCC AS PSI DN information element may have a minimum length of 3 octets and a maximum length of 10 octets.

Table 44 illustrates an example header format for the SCC-AS-id information element.

TABLE 44

| 8 | 7 | 6 | 5 | 4 | 3 | 2 | 1 | Octet |
|---|---|---|---|---|---|---|---|---|
| Information Element code | | | | | Code specific | | | 1 |
| 1 | 0 | 1 | 0 | 1 | | | | |
| Information Element length (in octets) | | | | | | | | 2 |

Table 45 illustrates an example SCC AS PSI DN header information element format.

TABLE 45

| 8 | 7 | 6 | 5 | 4 | 3 | 2 | 1 | Octet |
|---|---|---|---|---|---|---|---|---|
| 1 ext | type of number | | | Numbering plan identification | | | | octet 3 |
| Number digit 2 | | | | Number digit 1 | | | | octet 4* |
| Number digit 4 | | | | Number digit 3 | | | | octet 5* |
| 2) | | | | | | | | : |

Generally, referring to Table 45 the number digit(s) in octet 4 precedes the digit(s) in octet 5 etc. The number digit which would be entered first is located in octet 4, bits 1 to 4. If the called party BCD number contains an odd number of digits, bits 5 to 8 of the last octet may be filled with an end mark coded as "1111".

In the present system, generally, a UE and an SCC AS maintain a hash table associating keys with values. The keys may be hashes resulting of applying a hashing function to string values. SHA-1 can be used as the hash algorithm. The UE and the SCC AS may have one or more tables associating keys with values. The UE and the SCC AS may create a hash table of the URIs present in the P-Associated-URI header field. If the UE and SCC AS also subscribe to the Reg-Event package as documented in 3GPP TS 24.229 the UE and SCC AS may create a hash table of the GRUU's for URIs received in the Reg-Event package in addition to those received in the P-Associated-URI header field. Note that the a 200 (OK) response to a incoming REGISTER request may include a P-Associated-URI header field and may be delivered to the SCC AS as part of the third party registration procedures documented in 3GPP TS 24.229.

Figure 7:
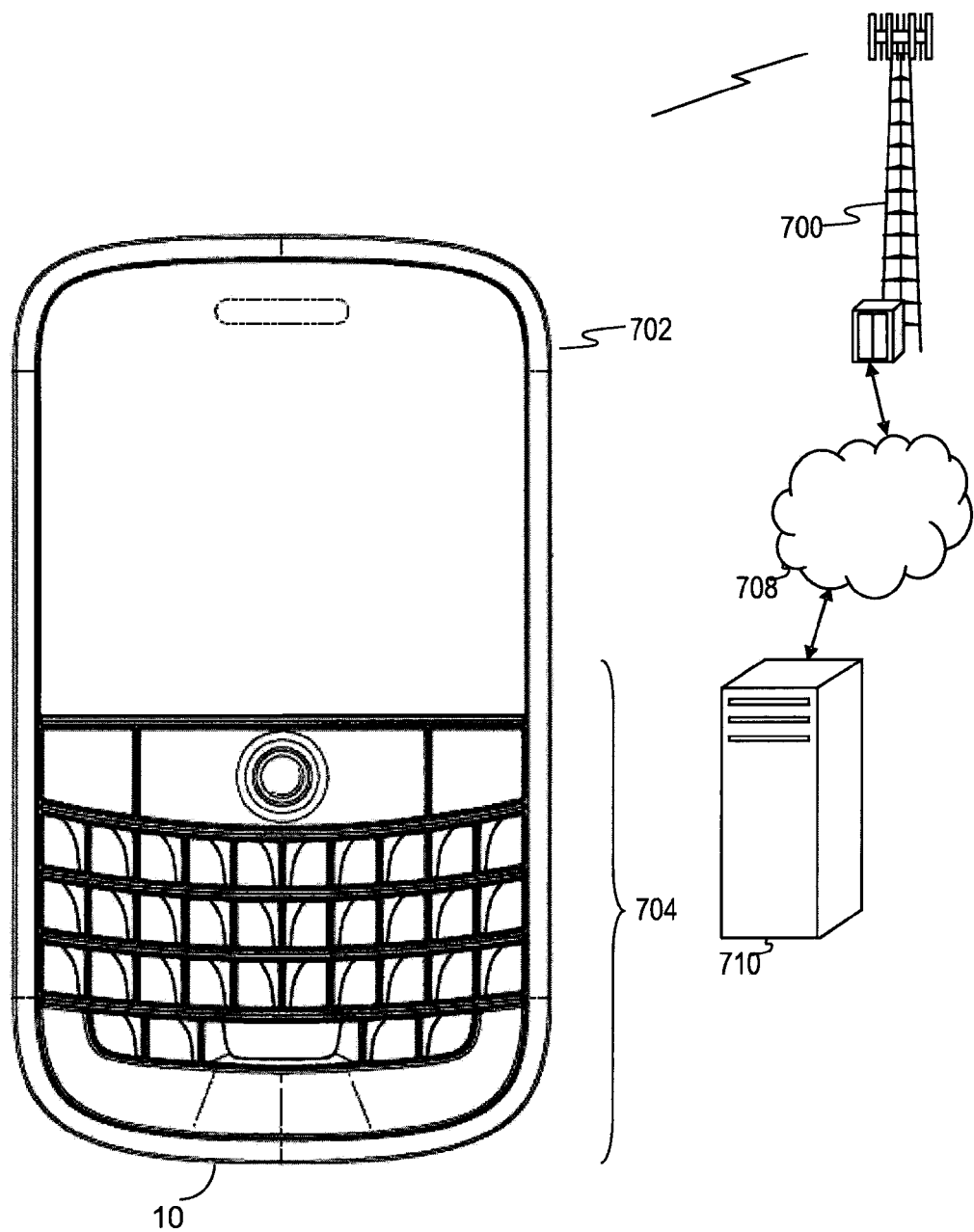
FIG. 7 is a diagram of a wireless communications system including a UA operable for some of the various embodiments of the disclosure.

FIG. 7 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 8:
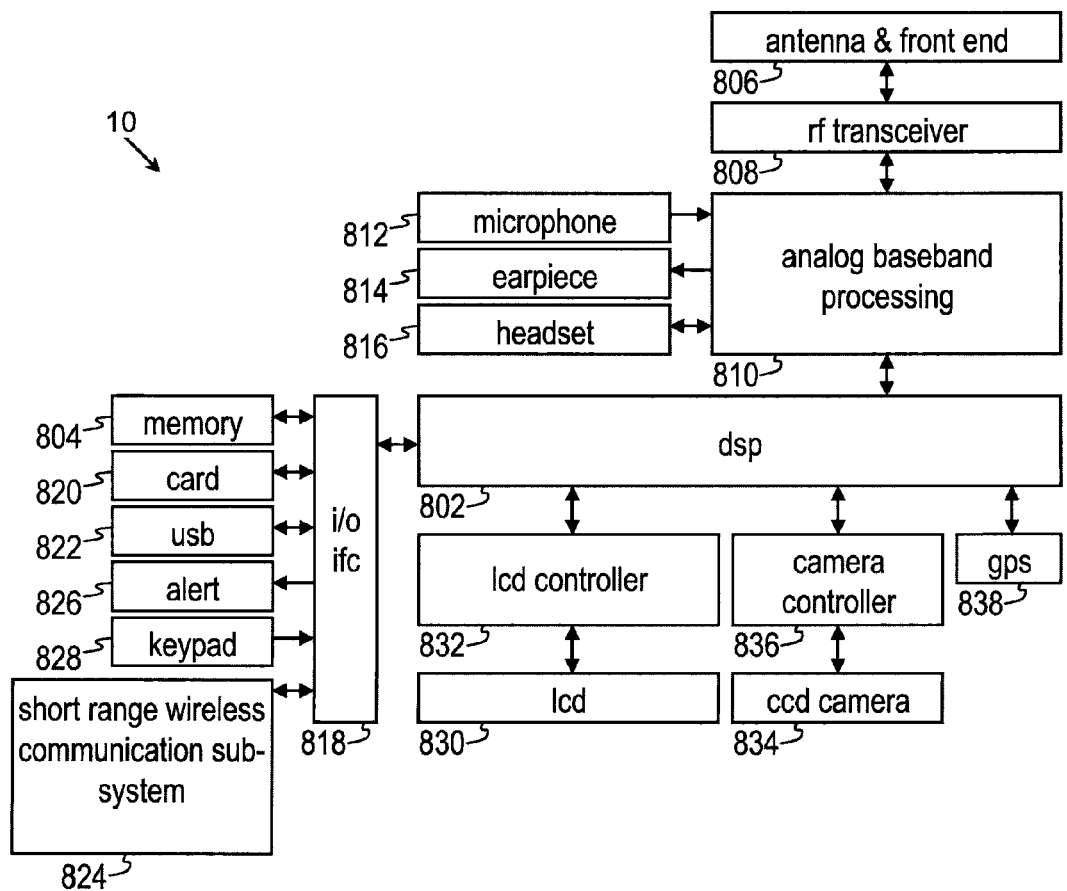
FIG. 8 is a block diagram of a UA operable for some of the various embodiments of the disclosure.

FIG. 8 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 9:
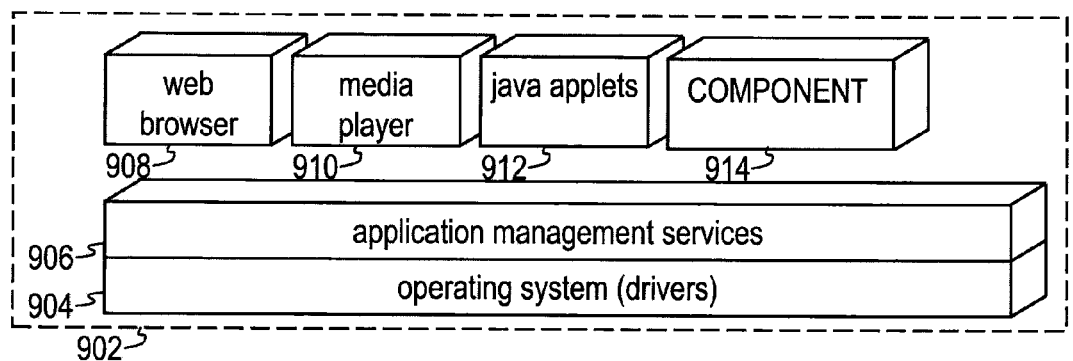
FIG. 9 is a diagram of a software environment that may be implemented on a UA operable for some of the various embodiments of the disclosure.

FIG. 9 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 9 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audio-visual media. The Java applets 912 configure the UA 10 to provide games, utilities, and other functionality. A component 914 might provide functionality described herein.

Figure 10:
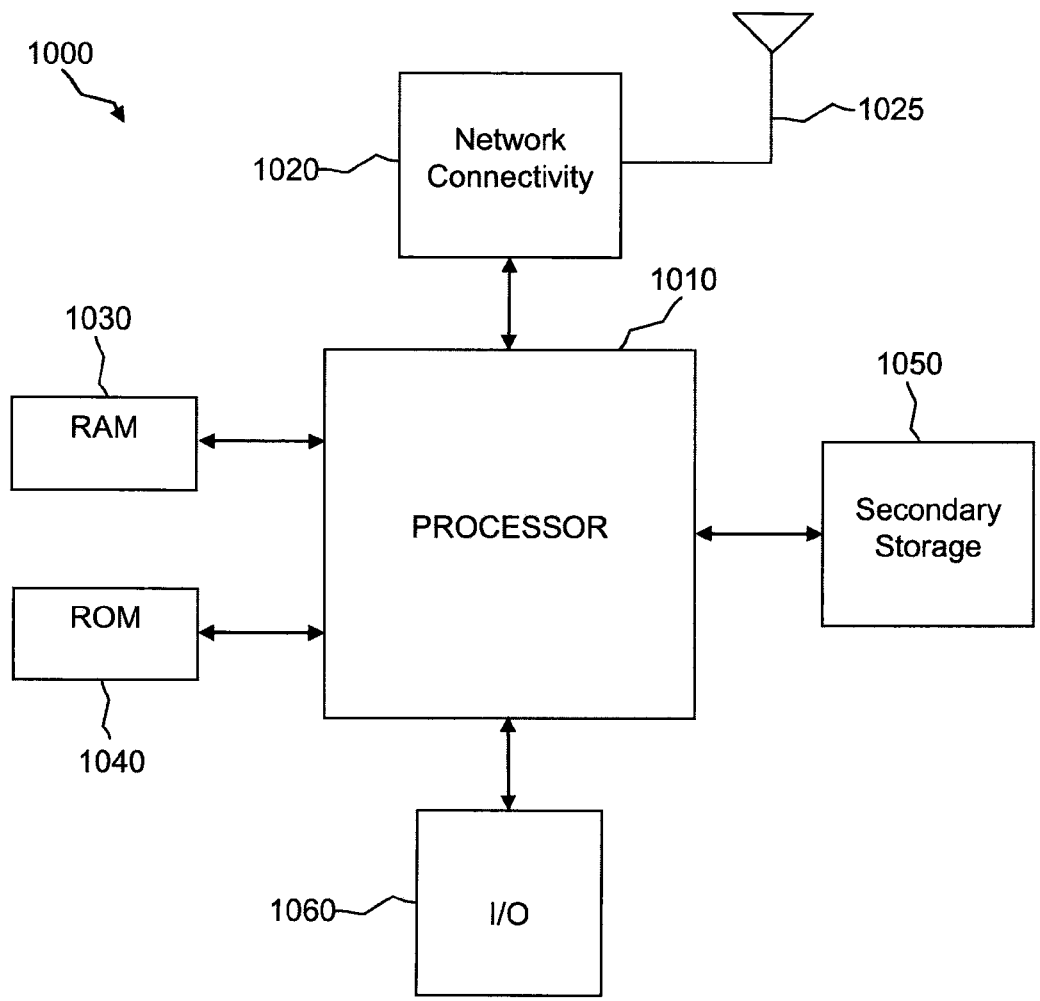
FIG. 10 is an illustrative general purpose computer system suitable for some of the various embodiments of the disclosure.

The UA 10, base station 12, and other components described above might include a processing component that is capable of executing instructions related to the actions described above. FIG. 10 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To apprise the public of the scope of this disclosure, the following claims are made.

What is claimed is:

1. A method for communicating using an I1 interface, the I1 interface providing a session control channel, the method comprising:
    identifying a session initiation protocol (SIP) encoded message;
    determining whether the SIP encoded message is to be transmitted using the I1 interface;
    in response to determining that the SIP encoded message is to be transmitted using the I1 interface and the SIP encoded message is larger than a maximum payload of the I1 interface, reducing a size of the SIP encoded message by:
        identifying a first string to be transmitted in a first information element of the SIP encoded message to at least one of a user agent (UA) and a network node, the first information element of the SIP encoded message including at least one of a uniform resource identifier (URI), a Public User Identity and a SIP UA capability;
        identifying a synchronization table associated with the at least one of the UA and the network node;
        using the synchronization table to identify a first key associated with the first string and the first information element of the SIP encoded message; and
        when the first key associated with the first string and the first information element of the SIP encoded message is identified in the synchronization table:
            encoding the first key within the first information element of the SIP encoded message instead of the first string, and
            transmitting the SIP encoded message to the at least one of the UA and the network node using the I1 interface; and
    in response to determining that the SIP encoded message is not to be transmitted using the I1 interface, not reducing the size of the SIP encoded message.

2. The method of claim 1, wherein the first string is a Public User Identity selected from a plurality of Public User Identities, the plurality of Public User Identities being sorted in a priority ordering, the priority ordering determining a key associated with each of the plurality of Public User Identities.

3. The method of claim 2, wherein the priority ordering of the plurality of Public User Identities is at least partially determined by a hashing algorithm.

4. The method of claim 1, wherein the Public User Identity is a default Public User Identity.

5. The method of claim 1, wherein the first key indicates the first string includes a default Public User Identity.

6. The method of claim 1, wherein the first key associated with the first string is determined using a hashing algorithm.

7. The method of claim 1, further comprising retrieveing the first key from memory, the memory being stored in an electronic storage medium.

8. A method for communicating a message using a second signaling protocol, the second signaling protocol providing a session control channel between a user agent (UA) and a network node, the method comprising:
- identifying a first string to be transmitted within a first data element of a first message, the first message being encoded in accordance with a first signaling protocol, wherein the first string includes at least one of a plurality of Public User Identities and a plurality of SIP user agent (UA) capabilities;
- associating the first string with a first key;
- storing the first string and the first key in a database, the database associating the first string and the first key;
- in response to determining that a size of a second message encoded in accordance with the first signaling protocol is larger than a maximum payload of the second signaling protocol:
  - identifying the first string to be transmitted within a second data element of the second message;
  - retrieving the first key from the database;
  - encoding the first key within the second data element of the second message in place of the first string; and
  - transmitting the second message using the second signaling protocol.

9. The method of claim 8, wherein the first string includes a plurality of data values, the method further comprising:
- sorting the plurality of data values into an ordering; and
- associating each of the plurality of data values with a key, the key being at least partially determined by the ordering of the plurality of data values.

10. The method of claim 9, wherein sorting the plurality of data values includes using a hashing algorithm to determine a hash value for each of the plurality of data values.

11. The method of claim 8, wherein the at least one of the a plurality of Public User Identities and the plurality of SIP user agent (UA) capabilities are sorted in a priority ordering.

12. The method of claim 11, wherein the priority ordering is used to identify a default Public User Identity.

13. The method of claim 8, further comprising:
- determining a hash value for each of the at least one of the plurality of Public User Identities and the plurality of SIP user agent (UA) capabilities; and
- sorting the at least one of the plurality of Public User Identities and the plurality of SIP user agent (UA) capabilities into an ordering, the ordering being at least partially determined by the hash values.

14. An apparatus for communicating using an I1 interface, the I1 interface providing a session control channel, the apparatus comprising:
- a processor;
- a memory storing instructions that, when executed by the processor, cause the processor to:
  - identify a session initiation protocol (SIP) encoded message;
  - determine whether the SIP encoded message is to be transmitted using the I1 interface;
  - in response to determining that the SIP encoded message is to be transmitted using the I1 interface and the SIP encoded message is larger than a maximum payload of the I1 interface, reduce a size of the SIP encoded message by:
    - identifying a first string to be transmitted in a first information element of the SIP encoded message to at least one of a user agent (UA) and a network node, the first information element of the SIP encoded message including at least one of a uniform resource identifier (URI), a Public User Identity and a SIP UA capability,
    - retrieving a first key associated with the first string, encoding the first key within the first information element of the SIP encoded message, and
    - transmitting the SIP encoded message using the I1 interface; and
  - in response to determining that the SIP encoded message is not to be transmitted using the I1 interface, not reduce the size of the SIP encoded message.

15. The apparatus of claim 14, wherein the first string is a Public User Identity selected from a plurality of Public User Identities, the plurality of Public User Identities being sorted in a priority ordering, the priority ordering determining a key associated with each of the plurality of Public User Identities.

16. The apparatus of claim 15, wherein the priority ordering of the plurality of Public User Identities is at least partially determined by a hashing algorithm.

\* \* \* \* \*

UNITED STATES PATENT AND TRADEMARK OFFICE
CERTIFICATE OF CORRECTION

| | |
|---|---|
| PATENT NO. | : 9,197,676 B2 |
| APPLICATION NO. | : 12/687668 |
| DATED | : November 24, 2015 |
| INVENTOR(S) | : Buckley et al. |

It is certified that error appears in the above-identified patent and that said Letters Patent is hereby corrected as shown below:

In the claims

Column 43, line 7, Claim 7, delete "retrieveing" and insert --retrieving--.

Signed and Sealed this
Ninth Day of August, 2016

Michelle K. Lee
*Director of the United States Patent and Trademark Office*